US010582465B2

(12) United States Patent
Olofsson et al.

(10) Patent No.: US 10,582,465 B2
(45) Date of Patent: Mar. 3, 2020

(54) METHODS AND ARRANGEMENTS FOR CONFIGURATION OF RADIO INTERFACE BASED SYNCHRONISATION

(71) Applicant: Telefonaktiebolaget LM Ericsson (publ), Stockholm (SE)

(72) Inventors: Mikael Olofsson, Belfort (FR); Angelo Centonza, Stockholm (SE); Magnus Sandgren, Staffanstorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 25 days.

(21) Appl. No.: 16/063,523

(22) PCT Filed: Dec. 21, 2015

(86) PCT No.: PCT/SE2015/051378
§ 371 (c)(1),
(2) Date: Jun. 18, 2018

(87) PCT Pub. No.: WO2017/111670
PCT Pub. Date: Jun. 29, 2017

(65) Prior Publication Data
US 2019/0007917 A1 Jan. 3, 2019

(51) Int. Cl.
*H04W 56/00* (2009.01)
*H04W 84/18* (2009.01)
*H04W 88/08* (2009.01)

(52) U.S. Cl.
CPC ..... *H04W 56/0015* (2013.01); *H04W 56/004* (2013.01); *H04W 84/18* (2013.01); *H04W 88/08* (2013.01)

(58) Field of Classification Search
None
See application file for complete search history.

(56) References Cited

U.S. PATENT DOCUMENTS

| 2005/0208942 A1* | 9/2005 | Pekonen | H04W 36/30 455/436 |
| 2010/0260168 A1* | 10/2010 | Gheorghiu | H04W 56/0015 370/350 |
| 2011/0134878 A1* | 6/2011 | Geiger | H04W 48/20 370/330 |

OTHER PUBLICATIONS

Author Unknown, "Technical Specification Group Radio Access Network; Network Assistance for Network Synchronization (Release 13)," Technical Report 36.898, Version 1.0.0, 3GPP Organizational Partners, Dec. 2015, 15 pages.
(Continued)

*Primary Examiner* — Saba Tsegaye
(74) *Attorney, Agent, or Firm* — Patent Portfolio Builders, PLLC

(57) ABSTRACT

A method for configuration of radio interface based synchronisation comprises obtaining of hearability information and synchronisation ability information concerning a multitude of radio base stations. The hearability information comprises an identity of the radio base station, and experienced signal quality from and identities of other radio base stations. The synchronisation ability information comprises information about a quality of synchronisation obtainable by the radio base station. A radio interface based synchronisation configuration is created in dependence of the obtained information. The radio interface based synchronisation configuration comprises definitions of synchronisation links, which radio base stations are recommended to use for synchronisation purposes. Data defining the radio interface based synchronisation configuration is provided for transmission to the respective radio base stations. Methods for radio interface based synchronisation and for planning radio interface based synchronisation, as well as arrangements and software for performing the methods are also presented.

35 Claims, 13 Drawing Sheets

(56) References Cited

OTHER PUBLICATIONS

Author Unknown, "Technical Specification Group Radio Access Network; Evolved Universal Terrestrial Radio Access Network (E-UTRAN); S1 Application Protocol (S1AP) (Release 13)," Technical Specification 36.413, Version 13.0.0, 3GPP Organizational Partners, Jun. 2015, 302 pages.
Ericsson, "R1-142390: On Radio-Interface Based Small Cell Synchronization," Third Generation Partnership Project (3GPP) TSG RAN WG1 Meeting #77, May 19-23, 2014, 6 pages, Seoul, Korea.
Ericsson et al., "R3-150788: Propagation delays in Radio Interface Based Synchronisation," Third Generation Partnership Project (3GPP) TSG-RAN WG3 Meeting #87bis, Apr. 20-24, 2015, 4 pages, Tenerife, Spain.
Huawei, "R3-141597: RAN3 aspects of RIBS," Third Generation Partnership Project (3GPP) TSG-RAN3 Meeting #85, Aug. 18-22, 2014, 6 pages, Dresden, Germany.
International Search Report and Written Opinion for International Patent Application No. PCT/SE2015/051378, dated Sep. 6, 2016, 9 pages.

\* cited by examiner

México
METHODS AND ARRANGEMENTS FOR CONFIGURATION OF RADIO INTERFACE BASED SYNCHRONISATION This application is a 35 U.S.C. § 371 national phase filing of International Application No. PCT/SE2015/051378, filed Dec. 21, 2015, the disclosure of which is incorporated herein by reference in its entirety.

TECHNICAL FIELD

The proposed technology generally relates to methods and devices for synchronisation of time in communication systems, and in particular to methods and devices used for radio interface based synchronisation.

BACKGROUND

3rd Generation Partnership Project (3GPP) Long Term Evolution (LTE) technology is a mobile broadband wireless communication technology in which transmissions from base stations (referred to as eNBs) to mobile stations (referred to as user equipment (UE)) are sent using orthogonal frequency division multiplexing (OFDM). OFDM splits the signal into multiple parallel sub-carriers in frequency.

In order to demodulate any transmissions on the downlink, a UE relies on reference symbols (RS) that are transmitted on the downlink. These reference symbols and their position in the time-frequency grid are known to the UE and hence can be used to determine channel estimates by measuring the effect of the radio channel on these symbols. The common reference symbols are used for channel estimation during demodulation of control and data messages in addition to synchronisation.

The network architecture for LTE allows messages to be sent between eNBs via an X2 interface. The eNB also can communicate with other nodes in the network, e.g., to the Mobility Management Entity (MME) via the S1 interface.

In current specification methods are specified that allow some self-organizing network (SON) functionality where an eNB can request information regarding another eNB via the MME. Currently, network interface based signaling for over the air synchronisation purposes is enabled by means of the S1. It shall be noted that the Radio Interface Based Synchronisation (RIBS) functions standardised in 3GPP Release 12 have the purpose of enabling a more accurate detection of the synchronisation source signal, so to improve the synchronisation accuracy. Moreover, muting patterns activation should enable an enhancement of the synchronisation source signal with respect to the case where interference from aggressor cells is not mitigated.

It should be further noted that according to the 3GPP standard, the time offset between two adjacent eNBs shall be within 3 µs. The interpretation of the 3 µs requirement forces in practice a need of Global Navigation Satellite System (GNSS) receivers or IEEE1588v2 PTP, but GNSS cannot be deployed in some installation like for example indoor or in some urban environments and IEEE1588v2 PTP would require investment in the network.

The 3GPP standard does not define how RIBS or a chain of RIBS links should be configured. In most cases there would be several possible sync paths to consider and characteristics for such paths are likely to change over time by e.g. deployment of new nodes or changes in nearby infrastructure and environments.

SUMMARY

It is an object to provide more robust methods and devices used for radio interface based synchronisation.

This and other objects are met by embodiments of the proposed technology.

In general words, according to a first aspect, there is provided a method for configuration of radio interface based synchronisation. The method comprises obtaining of hearability information and synchronisation ability information concerning a multitude of radio base stations. The hearability information comprises, for each radio base station of the multitude of radio base stations, an identity of the radio base station under consideration, and experienced signal quality of signals from other radio base stations of the multitude of radio base stations and identities of the other radio base stations of the multitude of radio base stations. The synchronisation ability information comprises, for each radio base station of the multitude of radio base stations, information about a quality of synchronisation, other than radio interface based synchronisation, obtainable by the radio base station under consideration. A radio interface based synchronisation configuration is created for the multitude of radio base stations, in dependence of the obtained hearability information and synchronisation ability information. The radio interface based synchronisation configuration comprises definitions of synchronisation links, which radio base stations of the multitude of radio base stations are recommended to use for synchronisation purposes. Data defining the radio interface based synchronisation configuration is provided for transmission to the respective radio base stations.

According to a second aspect, there is presented a method for planning radio interface based synchronisation. The method comprises performing of a method for configuration of radio interface based synchronisation according to the first aspect and further analysing of the radio interface based synchronisation configuration.

According to a third aspect, a method for radio interface based synchronisation comprises monitoring, in a base station, of experienced signal quality of signals from other base stations. Data defining the experienced signal quality of signals and identities of each of the other base stations is provided for transmission to a network node, as well as an identity of the base station. Data defining a radio interface based synchronisation configuration is obtained from the network node. Radio interface based synchronisation links are set up according to the obtained data defining a radio interface based synchronisation configuration.

According to a fourth aspect, a network node is configured to configure radio interface based synchronisation. The network node is configured to obtain hearability information and synchronisation ability information concerning a multitude of radio base stations. The hearability information comprises, for each radio base station of the multitude of radio base stations, an identity of the radio base station under consideration, and experienced signal quality of signals from other radio base stations of the multitude of radio base stations and identities of the other radio base stations of the multitude of radio base stations. The synchronisation ability information comprises, for each radio base station of the multitude of radio base stations, information about a quality of synchronisation, other than radio interface based synchronisation, obtainable by the radio base station under consideration. The network node is configured to create a radio interface based synchronisation configuration for the multitude of radio base stations, in dependence of the obtained hearability information and synchronisation ability information. The radio interface based synchronisation configuration comprises definition of synchronisation links, which radio base stations of the multitude of radio base stations are recommended to use for synchronisation purposes. The network node is configured to provide data defining the radio interface based synchronisation configuration for transmission to the respective radio base stations.

According to a fifth aspect, a base station is configured to perform radio interface based synchronisation. The base station is configured to monitor experienced signal quality of signals from other base stations. The base station is configured to provide data defining the experienced signal quality of signals and identities of each of the other base stations for transmission to a network node, as well as an identity of the base station. The base station is configured to obtain data defining a radio interface based synchronisation configuration from the network node. The base station is configured to set up radio interface based synchronisation links according to the obtained data defining a radio interface based synchronisation configuration.

According to a sixth aspect, a computer program comprises instructions, which when executed by at least one processor, cause the at least one processor to obtain hearability information and synchronisation ability information concerning a multitude of radio base stations. The hearability information comprises, for each radio base station of the multitude of radio base stations, an identity of the radio base station under consideration, and experienced signal quality of signals from other radio base stations of the multitude of radio base stations and identities of the other radio base stations of the multitude of radio base stations. The synchronisation ability information comprises, for each radio base station of the multitude of radio base stations, information about a quality of synchronisation, other than radio interface based synchronisation, obtainable by the radio base station under consideration. The instructions, when executed by at least one processor, cause the at least one processor to further create a radio interface based synchronisation configuration for the multitude of radio base stations, in dependence of the obtained hearability information and synchronisation ability information. The radio interface based synchronisation configuration comprises definitions of synchronisation links, which radio base stations of the multitude of radio base stations are recommended to use for synchronisation purposes. The instructions, when executed by at least one processor, cause the at least one processor to further provide data defining the radio interface based synchronisation configuration for transmission to the respective radio base stations.

According to a seventh aspect, a computer program comprises instructions, which when executed by at least one processor in a base station, cause the at least one processor to monitor experienced signal quality of signals from other base stations. The instructions, when executed by at least one processor, cause the at least one processor to further provide data defining the experienced signal quality of signals and identities of each of the other base stations for transmission to a network node, as well as an identity of the base station. The instructions, when executed by at least one processor, cause the at least one processor to obtain data defining a radio interface based synchronisation configuration from the network node. The instructions, when executed by at least one processor, cause the at least one processor to further set up radio interface based synchronisation links according to the obtained data defining a radio interface based synchronisation configuration.

According to an eighth aspect, a computer-program product comprises a computer-readable medium having stored thereon a computer program of the sixth or seventh aspect.

According to a ninth aspect, a carrier comprises the computer program of the sixth or seventh aspect, wherein the carrier is one of an electronic signal, an optical signal, an electromagnetic signal, a magnetic signal, an electric signal, a radio signal, a microwave signal, or a computer-readable storage medium.

According to a tenth aspect, a network node for configuration of radio interface based synchronisation comprises an information obtaining module for obtaining hearability information and synchronisation ability information concerning a multitude of radio base stations. The hearability information comprises, for each radio base station of the multitude of radio base stations, an identity of the radio base station under consideration, and experienced signal quality of signals from other radio base stations of the multitude of radio base stations and identities of the other radio base stations of the multitude of radio base stations. The synchronisation ability information comprises, for each radio base station of said multitude of radio base stations, information about a quality of synchronisation, other than radio interface based synchronisation, obtainable by the radio base station under consideration. The network node further comprises a configuration creating module for creating a radio interface based synchronisation configuration for the multitude of radio base stations, in dependence of the obtained hearability information and synchronisation ability information. The radio interface based synchronisation configuration comprises definition of synchronisation links, which radio base stations of the multitude of radio base stations are recommended to use for synchronisation purposes. The network node further comprises a data providing module for providing data defining the radio interface based synchronisation configuration for transmission to the respective radio base stations.

According to an eleventh aspect, base station comprising a monitoring module for monitoring experienced signal quality of signals from other base stations. The base station further comprises a data providing module for providing data defining the experienced signal quality of signals and identities of each of the other base stations for transmission to a network node, as well as an identity of the base station. The base station further comprises a data obtaining module for obtaining data defining a radio interface based synchronisation configuration from the network node. The base station further comprises a synchronising module for setting up radio interface based synchronisation links according to the obtained data defining a radio interface based synchronisation configuration.

An advantage of the proposed technology is that the RIBS links are allowed to be set up automatically in an optimal or at least acceptable way, preferably with the highest possible time accuracy in every eNB. Moreover, the configuration of the radio interface based synchronisation may dynamically adapt to changes within the network over time.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Throughout the present disclosure, "synchronisation" denotes synchronisation with respect to time if not explicitly described differently.

In the detailed description given here below, LTE is used as a model communication system. For a better understanding of the proposed technology, it may therefore be useful to begin with a brief overview of the LTE system and architecture. It should, however, be noted that although terminology from 3GPP LTE has been used in this disclosure to exemplify the invention, this should not be seen as limiting the scope of the invention to only the aforementioned system. Other wireless systems, including Wideband Code Division Multiple Access (WCDMA), WiMax, Ultra Mobil Broadband (UMB) and Global System for Mobile communication (GSM), may also benefit from exploiting the ideas covered within this disclosure.

Figure 1:
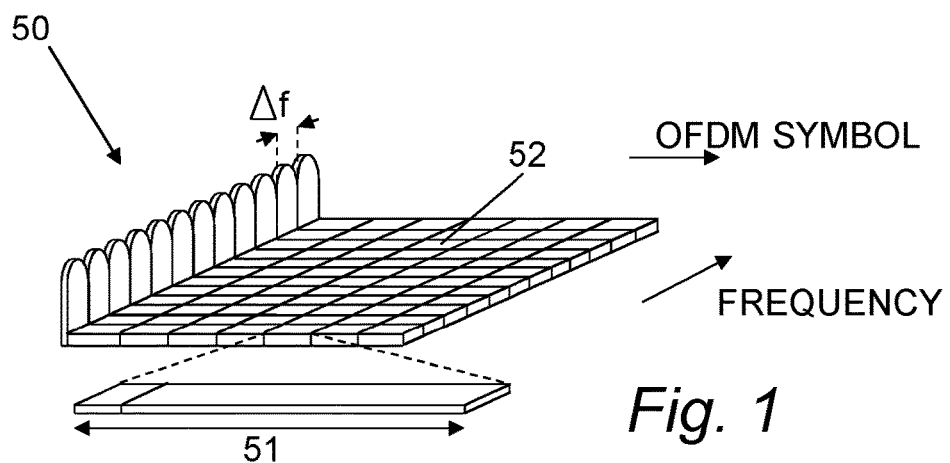
FIG. 1 is an illustration of the LTE downlink physical resource.

3GPP LTE technology is a mobile broadband wireless communication technology in which transmissions from eNBs to UEs are sent using OFDM. The basic unit of transmission in LTE is a resource block (RB) 50, see FIG. 1, which in its most common configuration consists of 12 subcarriers $\Delta f$ and 7 OFDM symbols 51 (one slot) including cyclic prefix. A unit of one subcarrier and one OFDM symbol is referred to as a resource element (RE) 52 see FIG. 1. Thus, an RB 50 consists of 84 REs 52.

Figure 2:
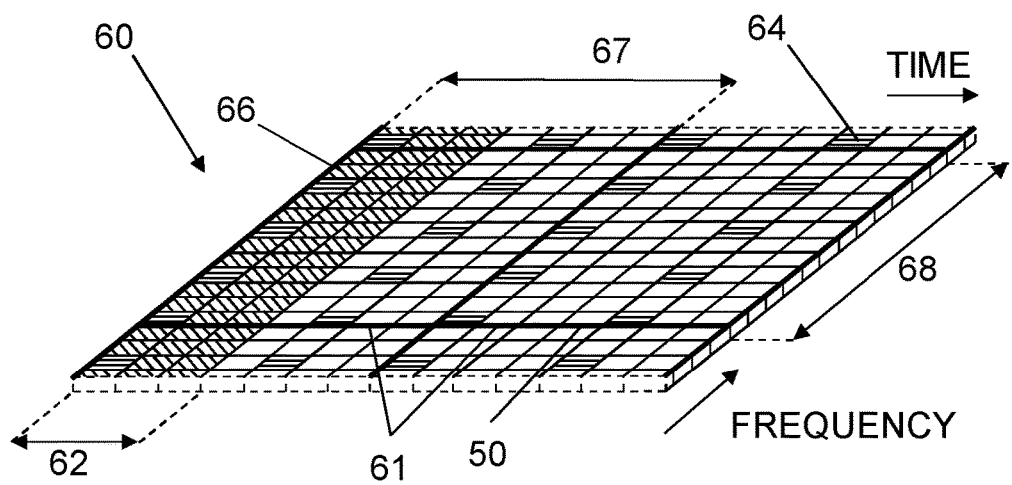
FIG. 2 is an illustration of a downlink subframe.

As illustrated in FIG. 2, an LTE radio subframe 60 is composed of two slots or RBs 50 in time and multiple RBs 50 in frequency with the number of RBs 50 determining the bandwidth of the system. Each RB 50 has a frequency width 68 of typically 12 subcarriers and a width 67 in time of typically 7 OFDM symbols. Furthermore, the two RBs in a subframe that are adjacent in time are denoted as an RB pair 61. Currently, LTE supports standard bandwidth sizes of 6, 15, 25, 50, 75 and 100 RB pairs.

In the time domain, LTE downlink transmissions are organized into radio frames of 10 ms, each radio frame consisting of ten equally-sized subframes of length $T_{subframe}=1$ ms. Each subframe comprises a control region 62 having control resource blocks 66.

The signal transmitted by the eNB in a downlink, i.e. the link carrying transmissions from the eNB to the UE, a subframe may be transmitted from multiple antennas and the signal may be received at a UE that has multiple antennas. The radio channel distorts the transmitted signals from the multiple antenna ports. In order to demodulate any transmissions on the downlink, a UE relies on reference symbols (RS) 64 that are transmitted on the downlink. These reference symbols 64 and their position in the time-frequency grid are known to the UE and hence can be used to determine channel estimates by measuring the effect of the radio channel on these symbols. In Rel-11 and prior releases of LTE, there are multiple types of reference symbols 64. The common reference symbols are used for channel estimation during demodulation of control and data messages in addition to synchronisation. The common reference symbols occur once every subframe.

Figure 3:
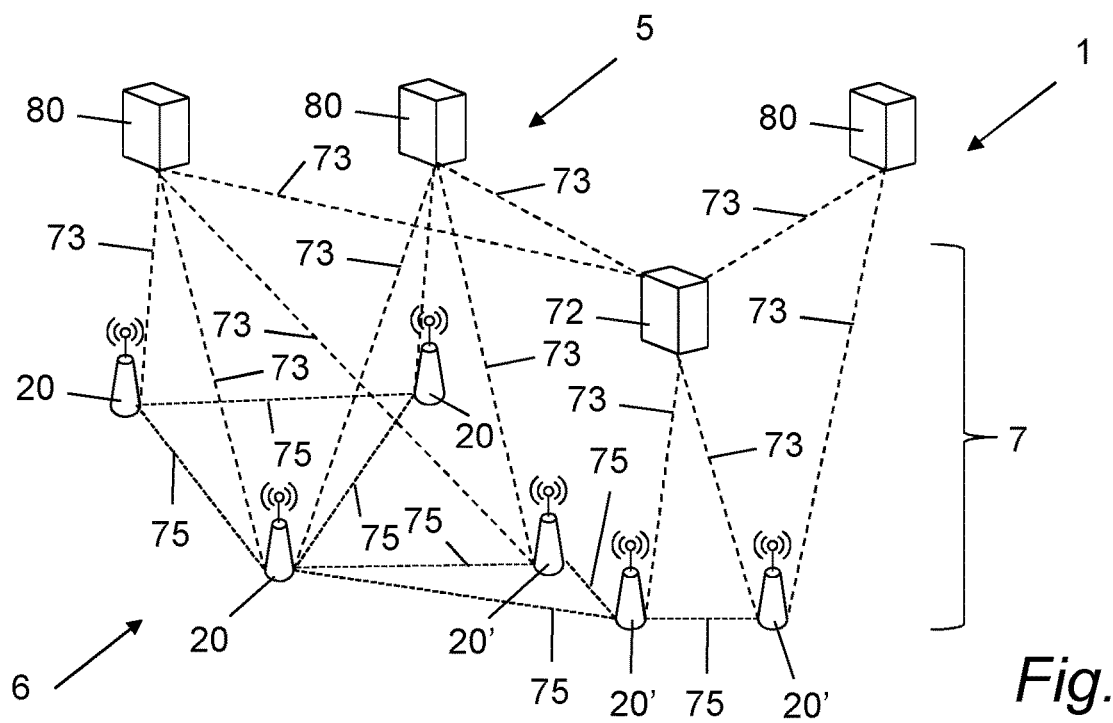
FIG. 3 is an illustration of an LTE architecture.

As mentioned in the background, in current specification methods are specified that allow some self-organizing network (SON) functionality where an eNB can request information regarding another eNB via the MME. In FIG. 3, an architecture of a wireless communication system 1 involving Evolved Universal Mobile Telecommunications System (UMTS) Terrestrial Radio Access Network (E-UTRAN) 7, a radio access network (RAN) 6 and a core network (CN) 5 is shown.

In FIG. 3, a number of eNB 20 are connected to MME's 80 and service gateways (S-GW) using S1 interfaces 73. The eNBs 20 may also communicate directly with each other using an X2 interface 75. In FIG. 3, also a number of Home eNBs (HeNB) 20' are illustrated. These HeNB may be connected to the CN, directly to MME's 80 as other eNBs or via a HeNB gateway (HeNB GW) 72, typically by use of the S1 interface, but in certain cases by an S5 interface.

The network architecture for LTE allows messages to be sent between eNBs, normal eNB or HeNBs, 20, 20' via an X2 interface 75. The eNB or HeNB 20, 20' also can communicate with other nodes in the network, e.g., to the MME 80 via an S1 interface 73.

Heterogeneous networks, where the macro cells and the small cells have vastly different transmit powers, may be deployed in two main ways. In the first deployment type, the small cell layer and the macro cell layer share the same carrier frequencies which creates interference between the two layers. In the second deployment type, the small cell layer and macro cell layer are on separate frequencies.

Figure 4:
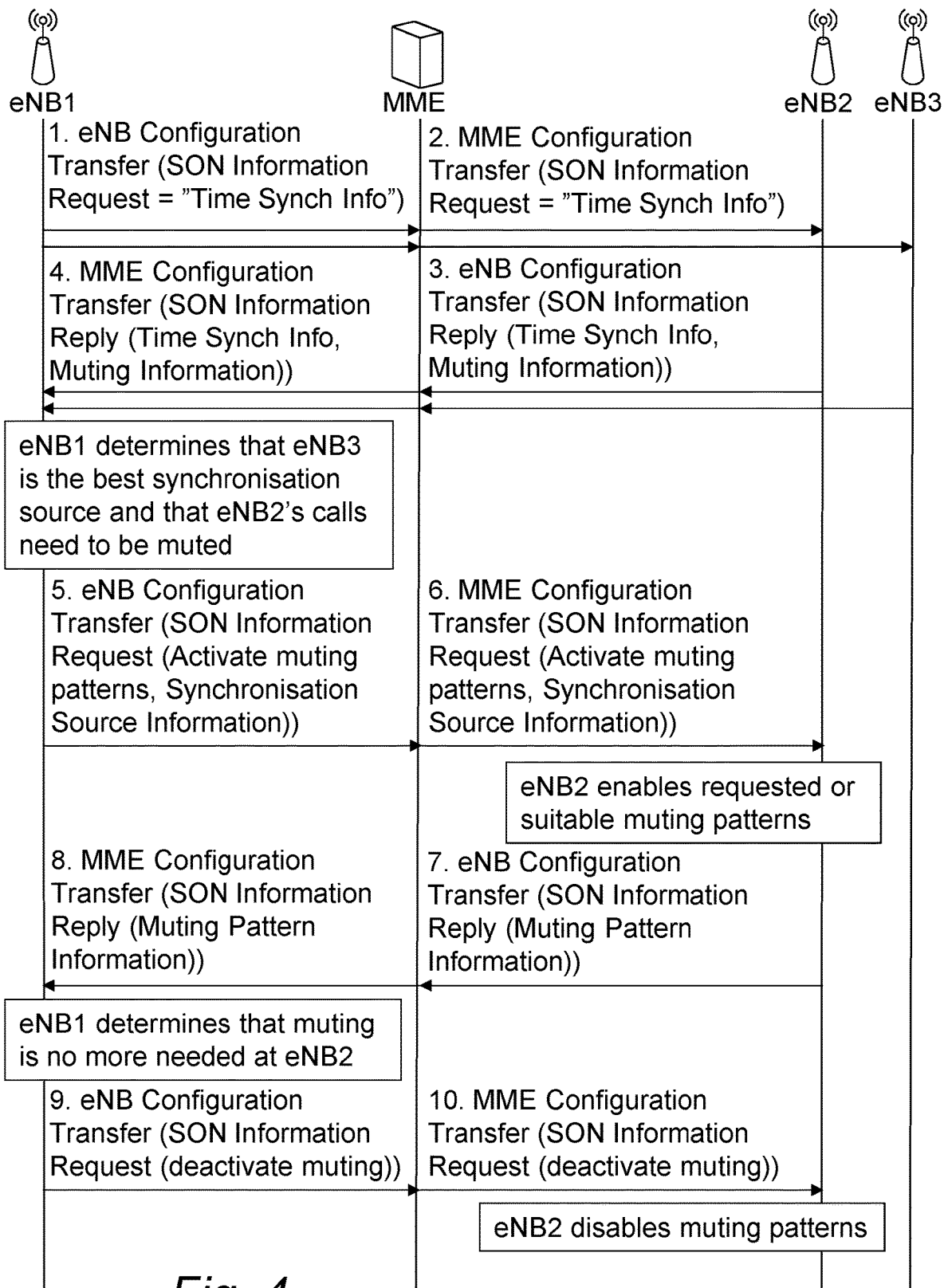
FIG. 4 is an illustration of S1 signaling to support radio interface based synchronisation.

Currently, network interface based signaling for over the air synchronisation purposes is enabled by means of the S1: eNB Configuration Transfer and S1: MME Configuration Transfer procedures. FIG. 4 illustrates an embodiment of such steps.

1. In a first signaling step, eNB1 generates an eNB Configuration Transfer message containing a SON Information Transfer Information Element (IE) with a SON Information Request IE set to "Time synchronisation Info".

2. The MME receiving the eNB Configuration Transfer message forwards the SON Information Transfer IE towards a target eNB2 and eNB3 indicated in the IE by means of the MME Configuration Transfer message.

3. The receiving eNB2/eNB3 may reply with an eNB Configuration Transfer message towards the eNB1 including a SON Information Reply IE with the Timing Synchronisation Information IE, which consists of Stratum Level and Synchronisation Status of the sending node. These two parameters can be defined as follows:

Stratum Level: indicates the number of hops between the node to which the stratum level belongs to and the source of a synchronised reference clock. That is, when the stratum level is M, the eNB is synchronised to an eNB whose stratum level is M−1, which in turn is synchronised to an eNB with stratum level M−2 and so on. The eNB with stratum level 0 is the synchronisation source.

Synchronisation Status: indicates whether the node signaling such parameter is connected (via the number of hops stated in the Stratum Level) to a synchronised reference clock (e.g. a Global Positioning System (GPS) source) or to a non-synchronised reference clock (e.g. a drifting clock). Also information of frequency synchronisation may be indicated.

Additionally the message can include information about availability of the muting function and details of already active muting patterns.

4. The MME receiving the eNB Configuration Transfer message from eNB2/eNB3 forwards it to eNB1 by means of the MME Configuration Transfer message.

eNB1 selects the best available cell's signal as synchronisation source and identifies whether there are neighbour cells interfering with the synchronisation source signal. In the present embodiment, the enB1 identifies that such interfering cells exist, e.g. in eNB2's cell.

5. eNB1 therefore sends an eNB Configuration Transfer message including information about the cell selected as synchronisation source as well as a request to activate muting on certain specific cells. The information on the synchronisation source cell may consist of the synchronisation RS period, offset, the synchronisation node's stratum level.

6. The MME receiving the eNB Configuration Transfer message from eNB1 forwards it to eNB2 by means of the MME Configuration Transfer message. eNB2 determines whether the muting request from eNB1 can be fulfilled and activates muting patterns that are most suitable to such request and enables the requested or suitable muting patterns.

7. eNB2 responds with an eNB Configuration Transfer message containing muting pattern information such as muting pattern period (period of muted subframes) and muting pattern offset.

8. The MME receiving the eNB Configuration Transfer message from eNB2 forwards it to eNB1 by means of the MME Configuration Transfer message.

9. If eNB1 determines that muting at eNB2's cells is no more needed, eNB1 can trigger an eNB Configuration Transfer message containing a muting deactivation request.

10. The MME receiving the eNB Configuration Transfer message from eNB1 forwards it to eNB2 by means of the MME Configuration Transfer message. eNB2 may then deactivate the muting pattern, i.e. it may freely transmit on the subframes previously muted.

It shall be noted that the Radio Interface Based Synchronisation (RIBS) functions standardised in 3GPP Release 12 and described above have the purpose of enabling a more accurate detection of the synchronisation source signal, so to improve the synchronisation accuracy. Hence, muting patterns activation should enable an enhancement of the synchronisation source signal with respect to the case where interference from aggressor cells is not mitigated.

Figure 5:
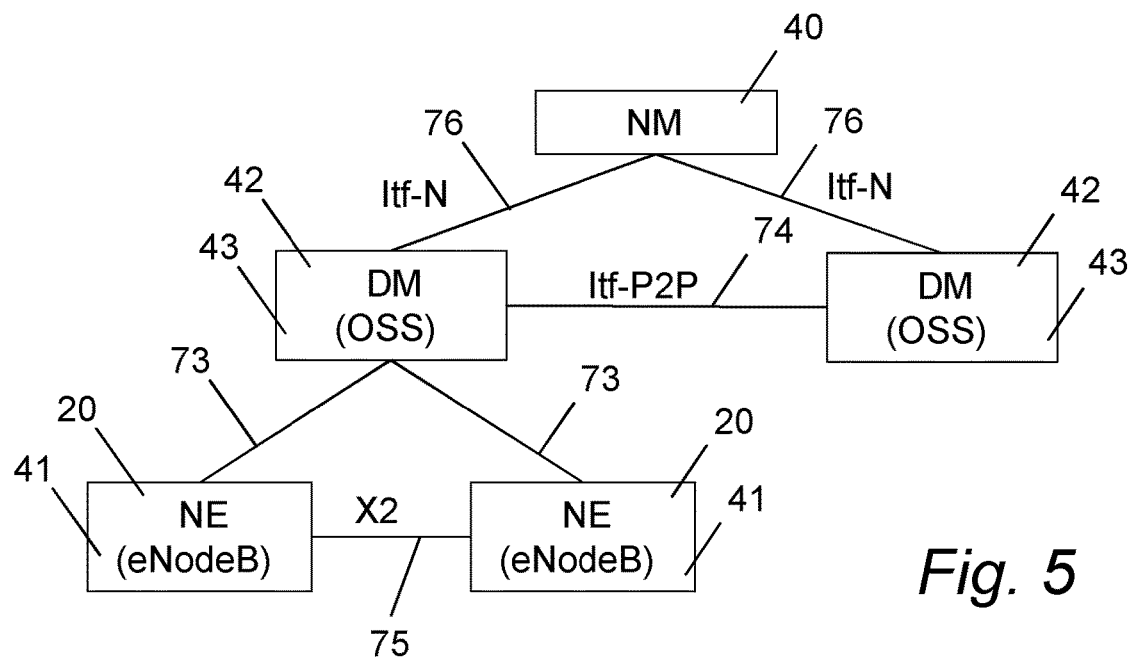
FIG. 5 is an illustration of a management system architecture.

An example of a management system assumed in an exemplary wireless communication system used in the present description is illustrated in FIG. 5. The node elements (NE) 41, also referred to as eNodeB 20, are managed by a domain manager (DM) 42, also referred to as the operation and support system (OSS) 43. A DM 42 may further be managed by a network manager (NM) 40. Two NEs 41 are interfaced by X2 75, whereas the interface 74 between two DMs 42 is referred to as Itf-P2P. The DM 42 is interfaced to the NEs 41 by an S1 interface 73, and an NM 40 is interfaced with the DMs 42 by an Itf-N 76 interface. The management system may configure the network elements 41, as well as receive observations associated to features in the network elements 41. For example, DM 42 observes and configures NEs 41, while NM 40 observes and configures DM 42, as well as NE 41 via DM 42.

By means of configuration via the DM 42, NM 40 and related interfaces 74, 76, functions over the S1 and X2 interfaces 73, 75 can be carried out in a coordinated way throughout the RAN, eventually involving the Core Network, i.e. MME and S-GWs.

It should be noted that according to the 3GPP standard, the time offset between two adjacent eNBs shall be within 3 μs. This is typically interpreted as an eNB needs to be within 1.5 μs relative a common time base, e.g. GPS time. GPS time is the number of seconds since 6 Jan. 1980. It is leap second free timescale that is traceable to UTC in the sense that that the time offset corrected for leap seconds to UTC is kept well within 40 ns An embodiment of a proposed technology for improving configuration of synchronisation links is to use a central node to automatically initiate a set up all the RIBS links based on information supplied by all eNBs in the network. Such configuration may also be adapted over time to changes in the network, e.g. deployments of new nodes, nodes that are turned off part of the day for overall network energy optimizations or in the surrounding environment with radio propagation impact. An eNB monitors the hearability of the known surrounding nodes and reports this hearability information to the central node. By hearability, it is meant any measurements or information from which an estimate of synchronisation quality and robustness could be deduced. In other words, by hearability is it intended the capacity of a radio node to detect signals from other radio transmitter in its neighbourhood. Such detection can be used for interference analysis by the radio node or it can be such to enable identification of the neighbour node transmitted signal as a synchronisation signal. The central node configures the synchronisation trails, i.e. the radio interface based synchronisation configuration, based on this information. The radio interface based synchronisation configuration comprising the definition of synchronisation links is then transmitted to the different eNBs to be implemented.

Such approach leads to that the RIBS links are automatically set up in a, preferably, optimal way with the highest possible time accuracy in every eNB and that the set up can be dynamically adapted to changes within the network over time. A common node would effectively coordinate e.g. PRS patterns and muting patterns. The functions with time accuracy requirements possible to enable are identified automatically for each eNB. Furthermore, limitations in the synchronisation network are identified for potential enhancements.

Figure 6:
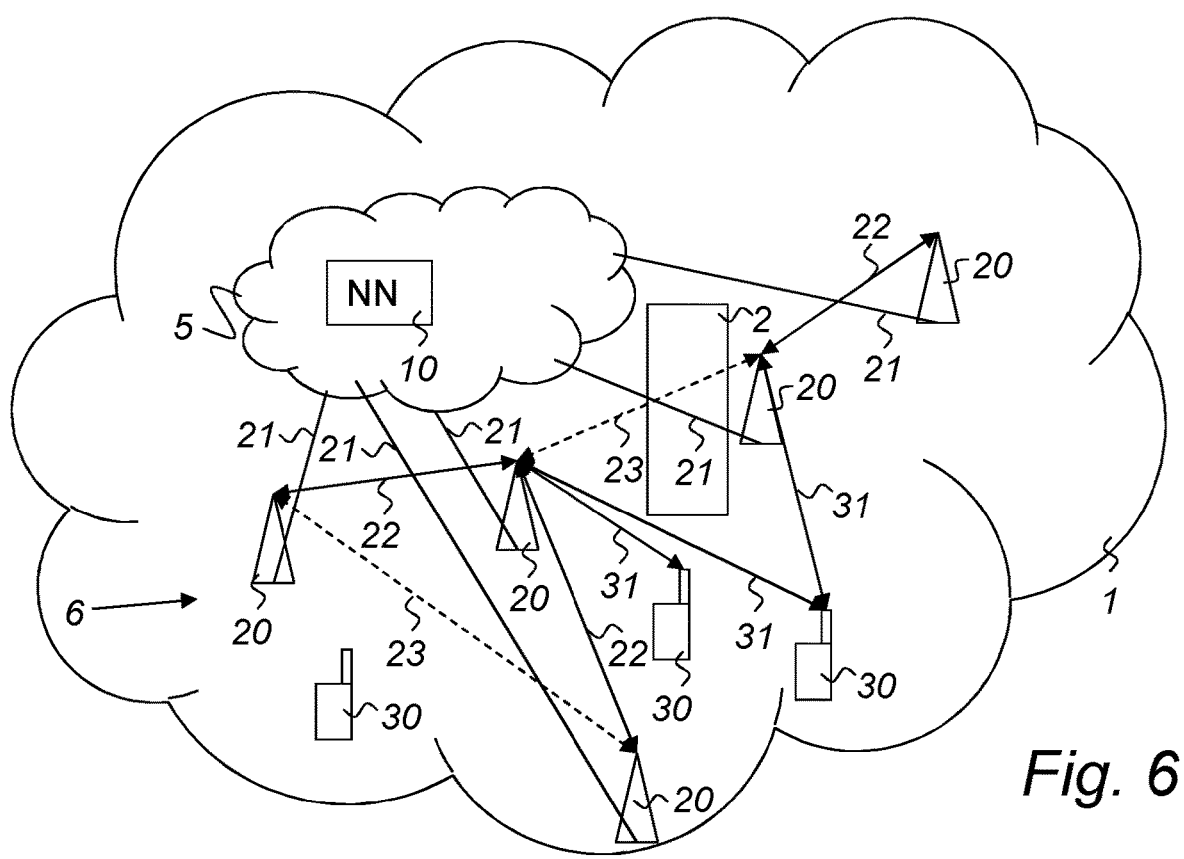
FIG. 6 is an illustration of wireless communication system.

In FIG. 6, a wireless communication system 1 is illustrated. The CN 5 comprises a network node (NN) 10, which is intended to handle the radio interface based synchronisation configuration. In the present embodiment, the NN 10 is part of the CN 5. However, in alternative embodiments, the NN 10 may be situated in the RAN 6, e.g. in an eNB or radio base station 20. The NN 10 may also be a distributed node, which in particular embodiments even may be based on cloud solutions.

A number of radio base stations 20 are in communicational contact 21 with the network node 10. The radio base stations 20 serve a number of UEs 30. The UEs 30 thereby may have established connections over the radio interface for signals 31 with one or more radio base station 20. The radio base stations 20 may also communicate over the radio interface using signals 22 on links directly between radio base stations 20. In some cases, the signal quality of the links become too low, as illustrated by reference number 23, e.g. due to large distances or obstacles 2, e.g. buildings or hills, prohibiting any useful signals to be exchanged.

Such a system can be relatively complex, and the use of handling of radio interface based synchronisation based on the actions of the individual base stations may not lead to any optimum or satisfactory overall configuration. In the presently presented technology, the approach is instead based on an exchange of information between the radio base stations 20 that are going to participate in the radio interface based synchronisation configuration and a central node, the NN 10. By supplying the central NN 10 with information about e.g. hearability between the radio base stations 20, an automatic configuration of the system in an optimum or at least sufficient manner can be accomplished. The solution thus comprises a cooperation between a number of radio base stations 20 and a central network node 10.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like.

In particular, the term "base station" may encompass different types of radio base stations including standardized base stations such as Node Bs, Home evolved Node Bs (HeNB) or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

Also note that terminology such as eNodeB and UE should be considered non-limiting and does in particular not imply a certain hierarchical relation between the two; in general "eNodeB" could be considered as device 1 and "UE" device 2, and these two devices communicate with each other over some radio channel. Similarly, when talking about signaling over an X2 or an S1 interface, the solutions are not limited to communication between eNBs or between eNB and Core Network (CN) but the communicating nodes can be any node terminating the interface over which the information described is transmitted.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

Figure 7:
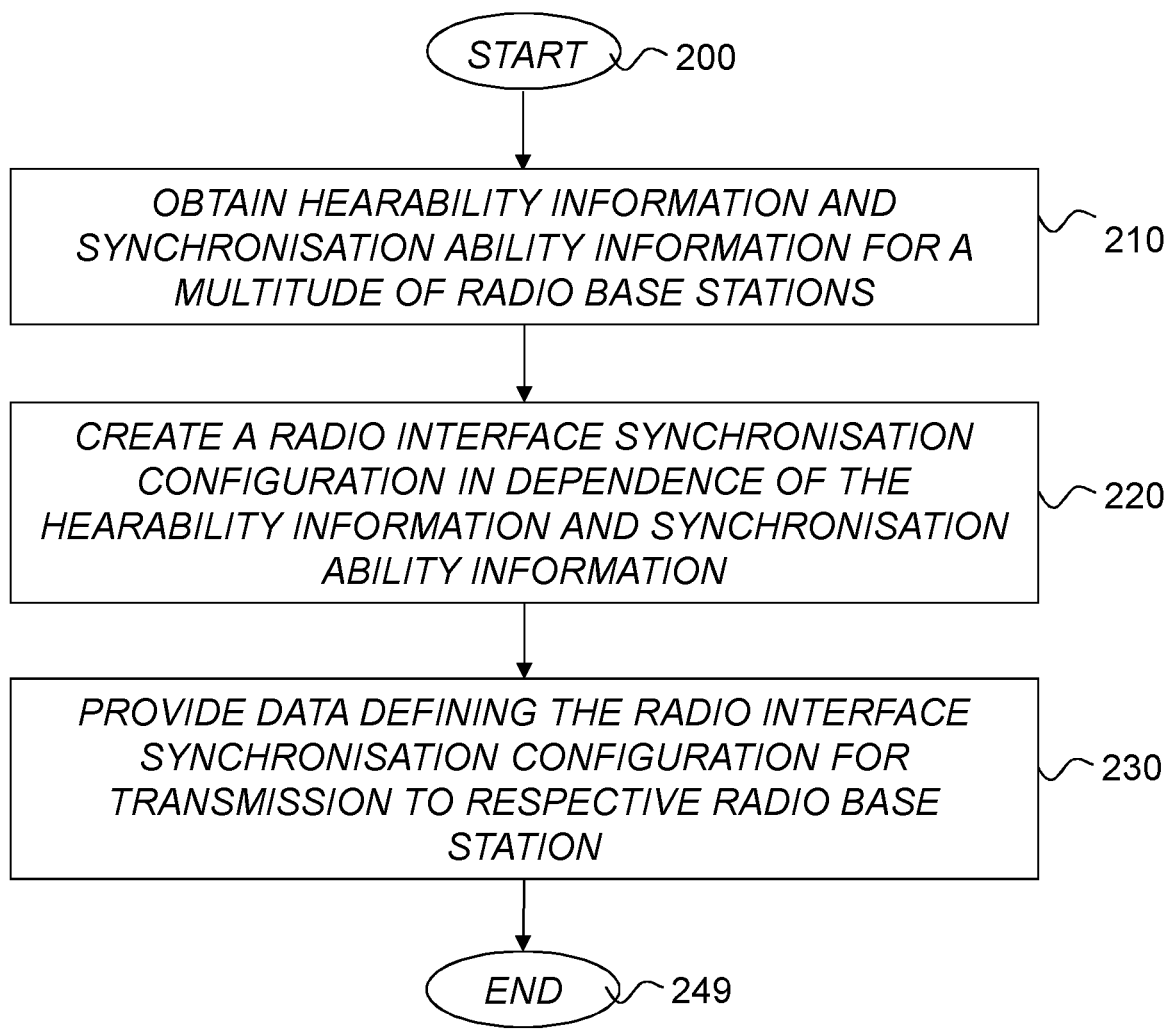
FIG. 7 is a flow diagram of steps of an embodiment of a method for configuration of radio interface based synchronisation.

FIG. 7 is a flow diagram of steps of an embodiment of a method for configuration of radio interface based synchronisation. The procedure starts in step 200. In step 210, hearability information and synchronisation ability information concerning a multitude of radio base stations is obtained. In particular embodiments, this step of obtaining hearability information and synchronisation ability information comprises the step of receiving hearability information and synchronisation ability information from nodes in a communication system comprising the multitude of radio base stations. Thus, the information can be received from the radio base stations themselves, or by any node having access to such radio base station associated information. In a particular embodiment, this step comprises receiving of the hearability information and synchronisation ability directly from the different involved radio base stations. The hearability information comprises, for each radio base station of the multitude of radio base stations, an identity of the radio base station under consideration. The hearability information further comprises experienced signal quality of signals from other radio base stations of the multitude of radio base stations as well as the identities of these other radio base stations. The synchronisation ability information comprises, also for each radio base station of the multitude of radio base stations, information about a quality of synchronisation, other than radio interface based synchronisation, obtainable by the radio base station under consideration. In other words, the quality of synchronisation describes the ability of the radio base station to be used as a synchronisation reference. A radio base station having access to e.g. a GNSS receiver is very suitable as synchronisation reference, whereas a radio base station relying on stable system clocks that are synchronised only intermittently may be considered as having a low quality of synchronisation.

In step 220, a radio interface based synchronisation configuration for the multitude of radio base stations is created. This radio interface based synchronisation configuration is made in dependence of the obtained hearability information and synchronisation ability information. The radio interface based synchronisation configuration comprises definitions of synchronisation links, which radio base stations of the multitude of radio base stations are recommended to use for synchronisation purposes. In other words, the network node generates a synchronisation connection plan, where radio base stations not having an own reliable synchronisation reference is connected by one or several radio links to a radio base station having a reliable synchronisation reference. This is typically made in the form of a number of tree structures, with a synchronisation reference at the root.

In step 230, data defining the radio interface based synchronisation configuration is provided for transmission to the respective radio base stations. In particular embodiments, this step of providing data defining the radio interface based synchronisation configuration comprises transmission of the data defining the radio interface based synchronisation configuration to the respective radio base stations. This can be performed by direct or indirect communications. The process ends in step 249.

In a particular embodiment, the approach may be used for identifying groups of eNBs that have little or no reception of PRS and/or CRS signals, or similar types of signals in other kinds of wireless communication systems, from the rest of the eNBs in the network. Such a group of eNBs is therefore not directly linked to any other such group and the use of a common time base is of lower importance. This means that the radio interface based synchronisation configuration can be performed separately for each such group, which thus may be denoted as a synchronisation component.

Figure 8:
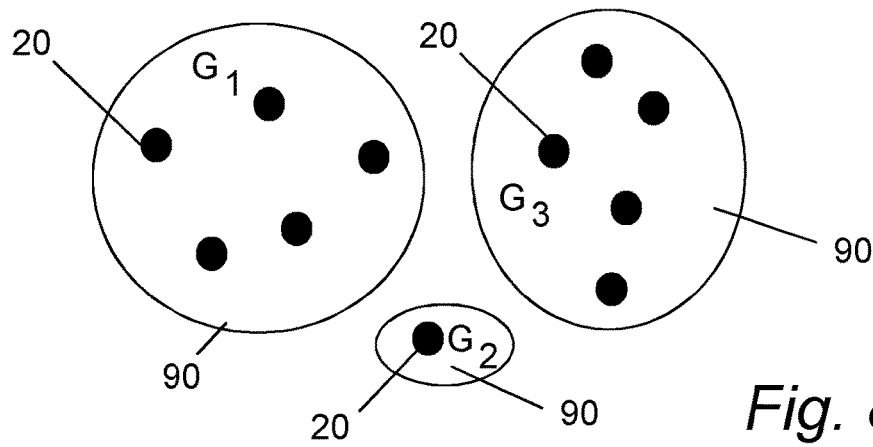
FIG. 8 is an illustration of a number of radio base stations partitioned in synchronisation components.

In FIG. 8, a graph of a number of eNBs or base stations 20 can be partitioned in one or several synchronisation components 90. For instance, the eNBs 20 within the synchronisation component $G_1$ are within hearability of each other, but outside the hearability range from eNBs 20 in the other synchronisation components $G_2$ and $G_3$. This reduces the numerical effort needed to find the optimal timing paths. Further, a synchronisation component could be a candidate for a "timing island", i.e. a partition of the network that could use an arbitrary time base, see further below.

Figure 9:
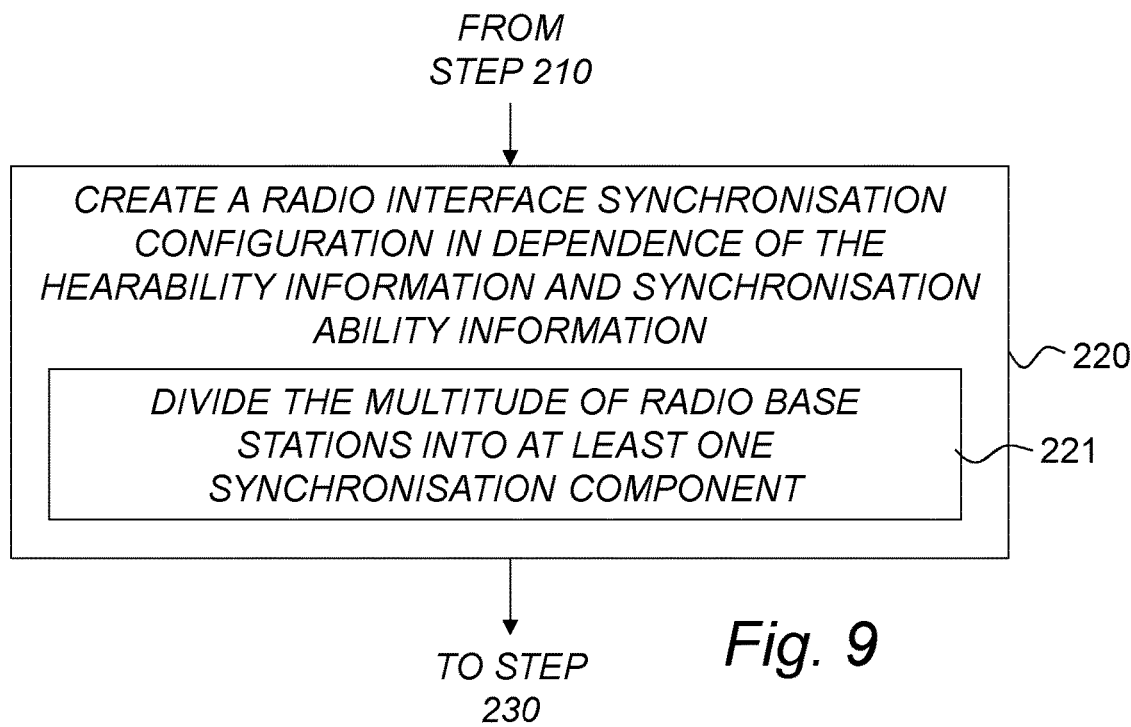
FIG. 9 is a flow diagram of an embodiment of step 220 of FIG. 7.

In FIG. 9, a particular embodiment of creating a radio interface based synchronisation configuration step 220 from FIG. 7 is illustrated. In step 221, the multitude of radio base stations are divided into at least one synchronisation component. Each radio base station in a synchronisation component is without hearability relative to all radio base stations outside the same synchronisation component. If a particular synchronisation component comprises more than one radio base station, each radio base station in that particular synchronisation component has hearability relative to at least one other radio base station in that particular synchronisation component. The radio interface based synchronisation configuration is then created individually for each synchronisation component.

In one embodiment, the central coordinator, i.e. the network node performing the creation of a radio interface based synchronisation configuration would determine a clustering groups by configuring an eNB with a list of cells to consider as possible synchronisation sources. The latter can occur by evaluating the information provided by each node regarding the neighbour cells signal strength. Also, this can be deduced by means of letting each eNB report to the central node time synchronisation information such as Stratum Level or synchronisation status, namely if the node is connected to a reliable source of synchronisation. The cluster can therefore be defined in terms of a number of eNBs taking part in it and a number of eNBs considered as the synchronisation sources. If not provided already with a Stratum Number, such synchronisation sources may be configured by the central node with a Stratum Number value.

Figure 10:
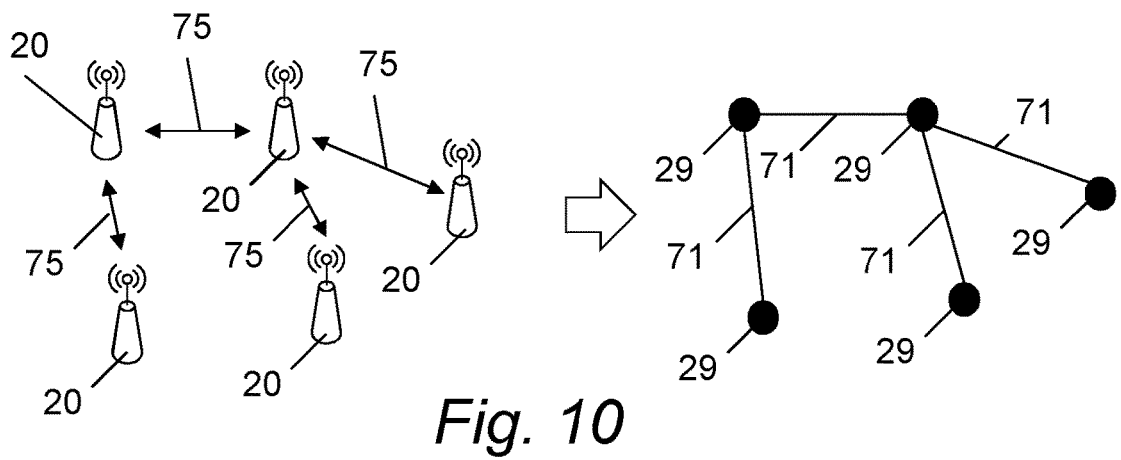
FIG. 10 is an illustration of an embodiment of a network of radio base stations modeled as a graph with vertices and edges.

In FIG. 10, an embodiment of a network of eNBs 20 that transmits timing over RIBS links 75 is modeled as a graph where each eNB is a vertex 29 and a RIBS link is an edge 71.

In one embodiment of the method the radio base stations are connected by edges, creating tree structures. Each component is thus divided into one or several tree subgraphs, i.e. a forest, where each tree has at least one vertex with a timing reference. The division into tree subgraphs is done in such a way that the synchronisation accuracy along the path from any vertex (radio base station) to a vertex with a synchronisation source is optimized or at least kept within acceptable levels.

Figure 11:
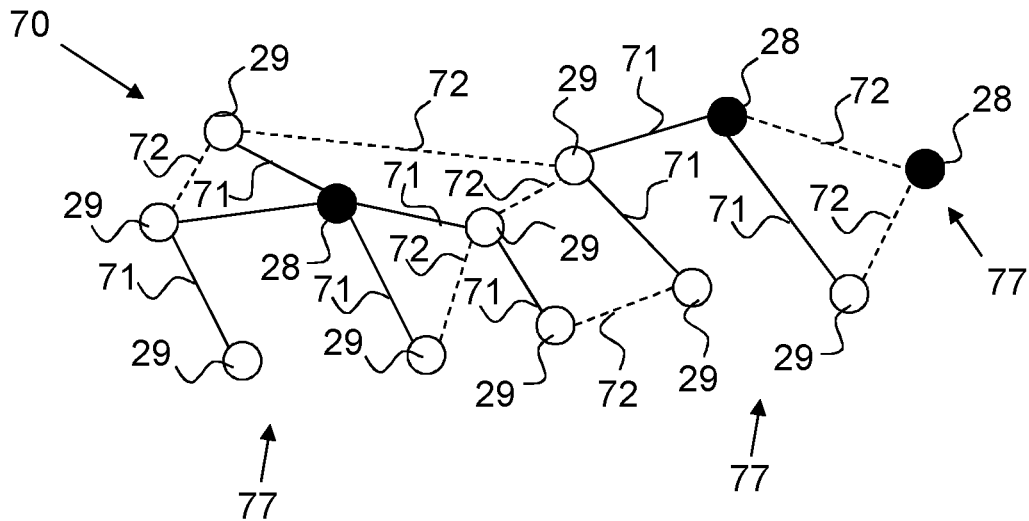
FIG. 11 is an illustration of an embodiment of a synchronisation component partitioned into trees.

In FIG. 11, an embodiment of a synchronisation component 70 has been partitioned into several trees. The filled vertices 28 have a respective reliable synchronisation references and unfilled vertices 29 doesn't. The solid edges 71 are used in the optimal synchronisation path and they span up three trees 77 in this synchronisation component 70. One of these "trees" comprises only the synchronisation reference itself. The dotted edges 72 correspond to alternatives for creating synchronisation paths, which in the present situation are not preferred. However, if the situation changes, such dotted edges 72 may be considered to be included in preferred synchronisation paths.

Figure 12:
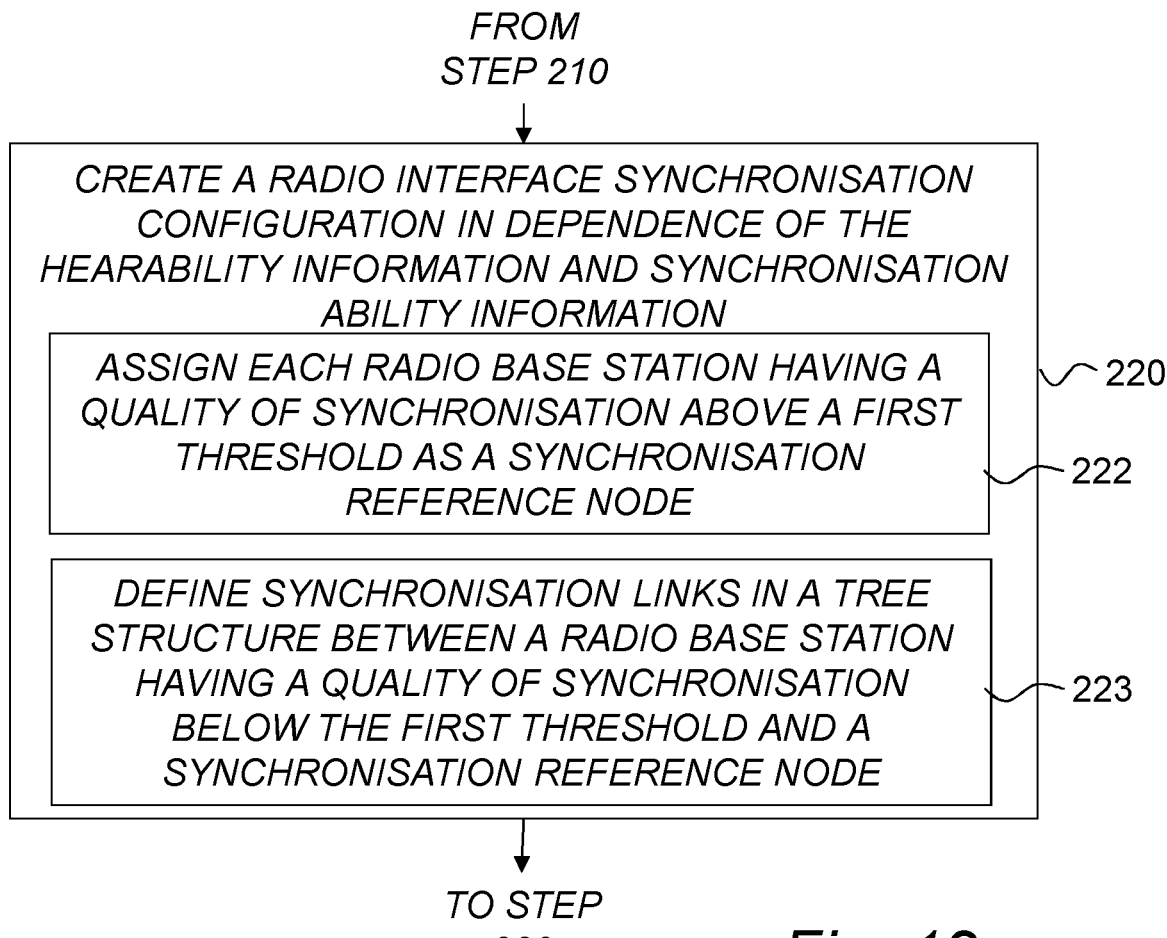
FIG. 12 is a flow diagram of another embodiment of step 220 of FIG. 7.

In FIG. 12, a particular embodiment of step 220 of creating a radio interface based synchronisation configuration from FIG. 7 is illustrated. In step 222, each radio base station that has a quality of synchronisation above a first threshold is assigning as a synchronisation reference node. In step 223, the synchronisation links are defined in a tree structure between each radio base station having the quality of synchronisation below the first threshold and a synchronisation reference node, either directly or via another radio base station(s). In other words, a number of synchronisation reference nodes are identified and/or assigned. The radio base stations that do not qualify as synchronisation reference nodes then have to be connected to such a synchronisation reference node. This connection should preferably be the choice offering the lowest synchronisation degradation due to the use of the connection. A tree structure is the optimum choice, avoiding synchronisation loops.

The steps of FIG. 12 may or may not be used together with the steps of FIG. 9.

As mentioned above, a synchronisation component comprises one or several radio base stations or eNBs. If such a group of eNBs doesn't have access to a synchronisation reference with exact time of day information, an arbitrary time base can be used within that group. The latter implies that the central node may decide to select one or more of the nodes in the cluster of eNBs not able to detect signals from other nodes to be assigned as the reference source of synchronisation. These nodes may be configured with a Stratum Level equal to zero. However, theses nodes are not necessarily connected to an accurate synchronisation source clock. In fact, such clock source may be drifting but it does not matter as long as it is common to all nodes of stratum level 0 if multiple synchronisation nodes are selected. This would not affect the performance of the cluster because all eNBs in the cluster would not be able to detect any neighbouring node signal and hence they are likely not to interfere with neighbouring nodes either. Even if phase synchronisation is lacking, the cluster would benefit from frequency synchronised nodes, this to reduce overall drift which in turn would allow less frequent synchronisation between nodes. Therefore the central node also receives information about node capability like frequency synchronisation availability together with node clock source drift information to optimize the overall network.

If only one or a small fraction of the radio base stations in the island synchronisation component are assigned as the reference source of synchronisation, such radio base station is preferably selected as to minimize the stratum levels within the synchronisation component.

In other words, if no radio base station in a particular synchronisation component has a quality of synchronisation above a first threshold, the step of creating a radio interface based synchronisation configuration may further comprise assigning of one radio base station in that particular synchronisation component as the synchronisation reference node. In a particular embodiment, such a specially assigned synchronisation reference node may be used as a synchronisation reference node in the steps of FIG. 12.

Thus, for instance, a group of eNB's, e.g. an indoor or urban PICO base installation, can use TDD and other time accuracy critical functions without access to a synchronisation reference with time of day, e.g. GPS.

As mentioned above, hearability is denoting the capacity of a radio node to detect signals from other radio transmitter in its neighbourhood, typically experienced signal quality of signals from other radio base stations of the multitude of radio base stations. In one preferred embodiment, the hearability information comprises signal-to-interference-and-noise ratio in reference signals from these other radio base stations. In a further preferred embodiment, the signal-to-interference-and-noise ratio is associated to a patterns of subframes on which the measurements has been collected.

The central node may also take care of other tasks like determining a propagation delay error and sending a compensation value to each cell pair. In the methods described herein, the central node will be able to compute propagation delays between different nodes' transmission points if it knows their geographical coordinates. The central node then uses this information to determine the best nodes to form a synchronisation cluster and to choose the best synchronisation source nodes.

In other words, the obtaining step of the network node further comprises obtaining of information enabling estimation of propagation delay compensation regarding at least two radio base stations of the multitude of radio base stations. The creation of the radio interface based synchronisation configuration thus comprises the step of determining propagation delay errors between radio base stations being associated with the information enabling estimation of propagation delay compensation. Thereby, the radio interface based synchronisation configuration is created in further dependence of the propagation delay errors.

Such function may be performed by means of knowing the geographical location of each transmission point at each node connected to the central node. Therefore, the central node may be able to estimate the propagation delay affecting on average transmissions between two nodes and configure the compensation offset that should be applied at each node when trying to calculate the clock offset via reception of neighbour node reference signals.

In a particular embodiment, the information enabling estimation of propagation delay compensation comprises position information regarding at least two radio base stations of the multitude of radio base stations.

It should be mentioned that in alternative embodiments, estimation of propagation delay compensation, that can be utilized within the present scheme, may be obtained based on other parameters than the position.

As mentioned earlier, in the process of identification of the nodes participating in RIBS it is important to identify nodes that would not need a common time base, i.e. which would not need to be synchronised with other nodes. With this respect, a node that is not interfered or interfering other components and could use an arbitrary time base is called a timing island. Such characteristic of a node can be deduced by e.g. analysing the node's measurements towards other neighbouring cells. Information can also be deduced by analysing UE measurements of different neighbouring cells reported to the central node. UE's between two eNB's can experience interference from neighbouring cells even if the eNB's themselves are isolated towards each other e.g. due to blocking buildings. For instance, in FIG. 6, one of the UEs 30 is in contact with two radio base stations 20, at the same time as these radio base stations are outside hearability from each other, in this case caused by a blocking building 2.

As an example, by analysing the SINR of other detected cells measured at the node and by analysing the SINR of the node's cells measured at other nodes it is possible to see whether there is an interference coupling between the node and other eNBs. Thresholds on node measurements can be established in order to determine whether a coupling exists and therefore whether a common timing needs to be ensured between nodes. For example, such thresholds could be set on the SINR measurements analysed.

Thus, in one embodiment, the hearability information could be complemented by an UE's perspective of the synchronisation quality. In other words, the step of obtaining hearability information and synchronisation ability information, performed in the network node, further comprises obtaining of information from user equipments being within hearability of two radio base stations of the multitude of radio base stations. The information from user equipments comprises experienced interference between signals from the two radio base stations and optionally a user equipment estimate of a time offset between said two radio base stations. Thereby, the radio interface based synchronisation configuration is created in further dependence of the information from user equipments. In particular, any partitioning in islands or synchronisation components may be performed in dependence of if there are any UEs reporting any interference.

In one embodiment, a central node could coordinate PRS patterns and muting patterns in an optimal way to increase overall time accuracy, still keeping PRS signaling overhead to a minimum.

In one embodiment of the method, the central node would determine which eNB is interfering with other synchronisation target eNBs. These eNBs would typically be the nodes that will need to mute some subframes in order to allow synchronisation target nodes to synchronise properly. However, interfering nodes may be synchronisation sources to other nodes. The central coordinator would know this by virtue of having configured synchronisation clusters. On the bases of such knowledge the central node may configure muting patterns for interfering nodes in a way that the interfering node is still able to provide synchronisation reference signals to the synchronisation target nodes within its cluster. The central node would also have to ensure that muting patterns adopted by nodes interfering with the same victim nodes are coordinated, namely that such patterns overlap in full or in part, in order to ensure maximum reduction of interference at the victim node.

In other words, the radio interface based synchronisation configuration further comprises information of a muting pattern.

Up to now, the focus has been on the central node, i.e. the network node creating the radio interface based synchronisation configuration. However, also the radio base stations are involved in the total scheme.

Figure 13:
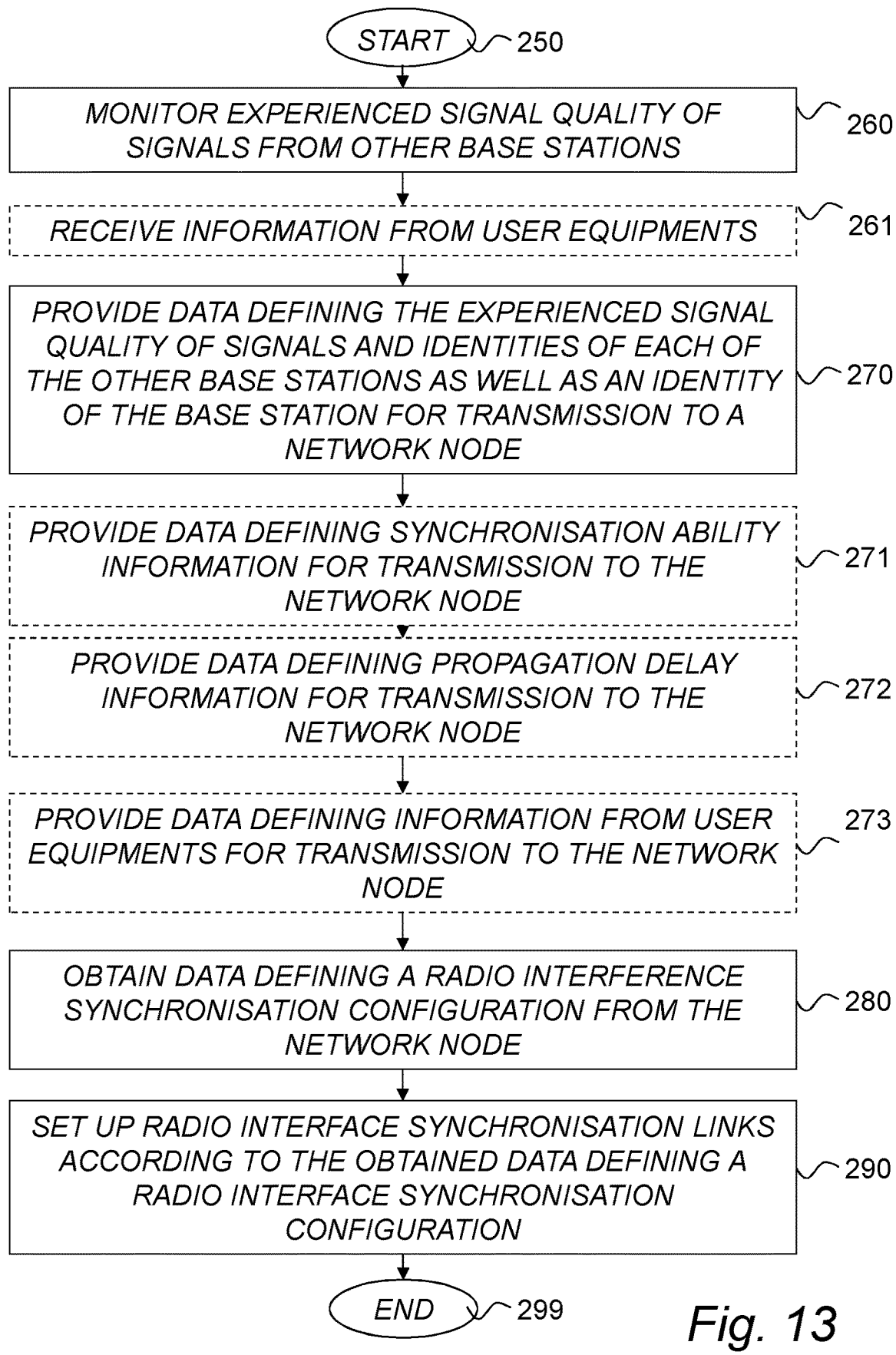
FIG. 13 is a flow diagram of steps of an embodiment of a method for radio interface based synchronisation.

In FIG. 13, a flow diagram of steps of an embodiment of a method for radio interface based synchronisation is illustrated. The method is intended to be performed by or in a radio base station. Steps comprised in particular following embodiments are marked with dotted lines. The procedure starts in step 250. In step 260, experienced signal quality of signals from other base stations is monitored. In a particular embodiment, the experienced signal quality of signals from other radio base stations comprises signal-to-interference-and-noise ratio in reference signals. In a further particular embodiment, the signal-to-interference-and-noise ratio is associated to a patterns of subframes on which the measurements has been collected.

In step 270, data defining the experienced signal quality of signals and identities of each of the other base stations are provided for transmission to a network node, as well as an identity of the base station. In step 280, data defining a radio interface based synchronisation configuration is obtained from the network node. Finally, in step 290, radio interface based synchronisation links are set up according to the obtained data defining a radio interface based synchronisation configuration. The way in which this set up is performed may follow standard prior art procedures and are therefore not further discussed. The procedure ends in step 299.

In a particular embodiment, the radio interface based synchronisation configuration further comprises information of a muting pattern.

The synchronisation ability information of the base station may be provided to the network node creating the radio interface based synchronisation configuration by any node in the communication system having access to such information. However, in a particular embodiment, also such information can be provided originating from the radio base station itself. In such a case, the method for radio interface based synchronisation comprises, as illustrated by step 271 of FIG. 13, the further step of providing data defining synchronisation ability information of the base station for transmission to the network node.

As described further above in a particular embodiment of the method for configuration of radio interface based synchronisation, propagation delay compensation may be of importance. The radio base station may provide also such information. In a particular embodiment, the method for radio interface based synchronisation comprises the further step of providing data defining information enabling estimation of propagation delay compensation regarding communication between the base station and other radio base stations for transmission to the network node. This is illustrated in step 272 of FIG. 13. The information enabling estimation of propagation delay compensation comprises in a particular embodiment position information.

As also discussed further above, information from UEs may also contribute to the optimization of the configuration of radio interface based synchronisation. In a particular embodiment, the method for radio interface based synchronisation comprises the further step of receiving information from user equipments being within hearability of two radio base stations, as illustrated in step 261 of FIG. 13. The information from user equipments comprises experienced interference between signals from the two radio base stations. The method further comprises step 273, in which data defining the information from user equipments is provided for transmission to the network node.

One objective for the technology presented herein is the optimization of a configuration of radio interface based synchronisation based on the presently available resources. However, based on the information in the central node it is also visible where a directed effort like adding a GPS receiver would increase the overall time accuracy by e.g. decreasing long synchronisation trails or introduce a source eNB with lower SINR value or time synchronise an island to avoid having interference in an UE between the two clusters.

For instance, addition of e.g. a GNSS receiver may not only assist in improving synchronisation in the radio base station in which the GNSS receiver is added, but may also improve the situation also for other radio base stations. FIG. 11 can be used as an example. Three of the vertices 29 have a Stratum Level of 2, i.e. there are two edges 71 between the vertices 29 and a vertex 28 having a reliable synchronisation reference. Two of these stratum level 2 vertices 29 are situated relatively close to each other and are within hearability distance. If a new GNSS receiver is installed in one of these two vertices 29, also the other vertex 29 will benefit, since it then may decrease its stratum level to 1 by the direct link to the new GNSS receiver.

The information in the central node is thus suitable for performance monitoring of the synchronisation quality and accuracy over time and can thereby also actively adapt to changes.

Figure 14:
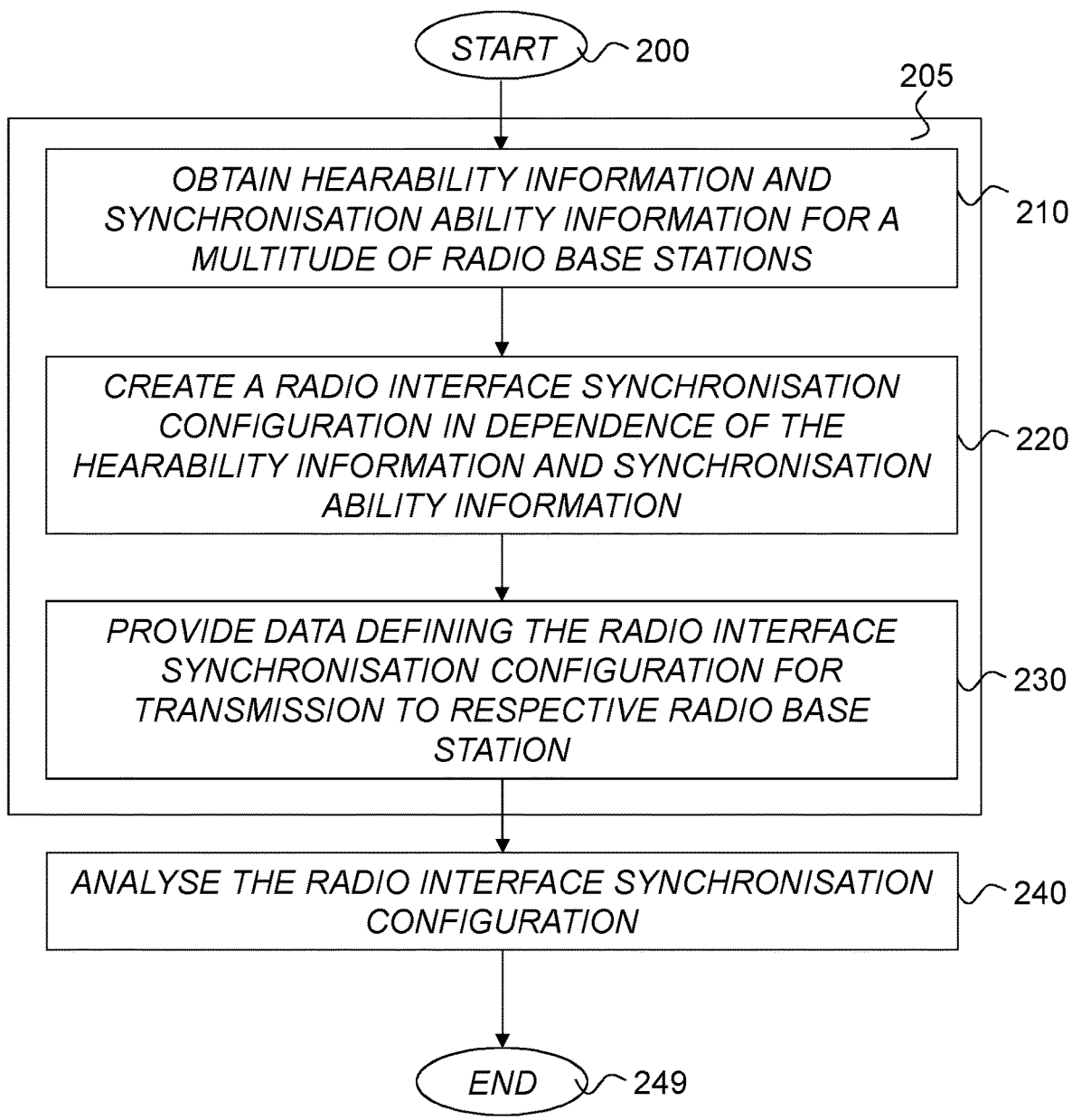
FIG. 14 is a flow diagram of steps of an embodiment of a method for planning radio interface based synchronisation.

In FIG. 14, a flow diagram of steps of an embodiment of a method for planning radio interface based synchronisation is illustrated. The method starts with a method 205 for configuration of radio interface based synchronisation according to the previous described procedures. In step 240, the radio interface based synchronisation configuration is then analysed.

In one embodiment, the step 240 of analysing the radio interface based synchronisation configuration comprises estimating of a synchronisation quality of radio base stations of the multitude of radio base stations.

In one embodiment, the step 240 of analysing the radio interface based synchronisation configuration comprises identifying radio base stations in the radio interface based synchronisation configuration not fulfilling synchronisation demands of a future update for finding parts being in need of improvement concerning redundancy or increasing synchronisation demands. This can be combined with the embodiment above.

In one embodiment, the step 240 of analysing the radio interface based synchronisation configuration comprises adding a fictive synchronisation ability of a radio base station of the multitude of radio base stations and repeating the step of creating 220 a radio interface based synchronisation configuration, allowing an effect of an updated synchronisation ability to be estimated.

Based on the central nodes estimate of each eNBs time accuracy and accuracy of adjacent eNBs, the central node can supply the information to the operator on what functions would be possible to enable. Functions could be for example eICIC, OTDOA, eMBMS etc.

One aspect of the proposed solution in this presentation is to use a central node to automatically set up all the RIBS links based on information supplied by all eNBs in the network as described further above.

Figure 15:
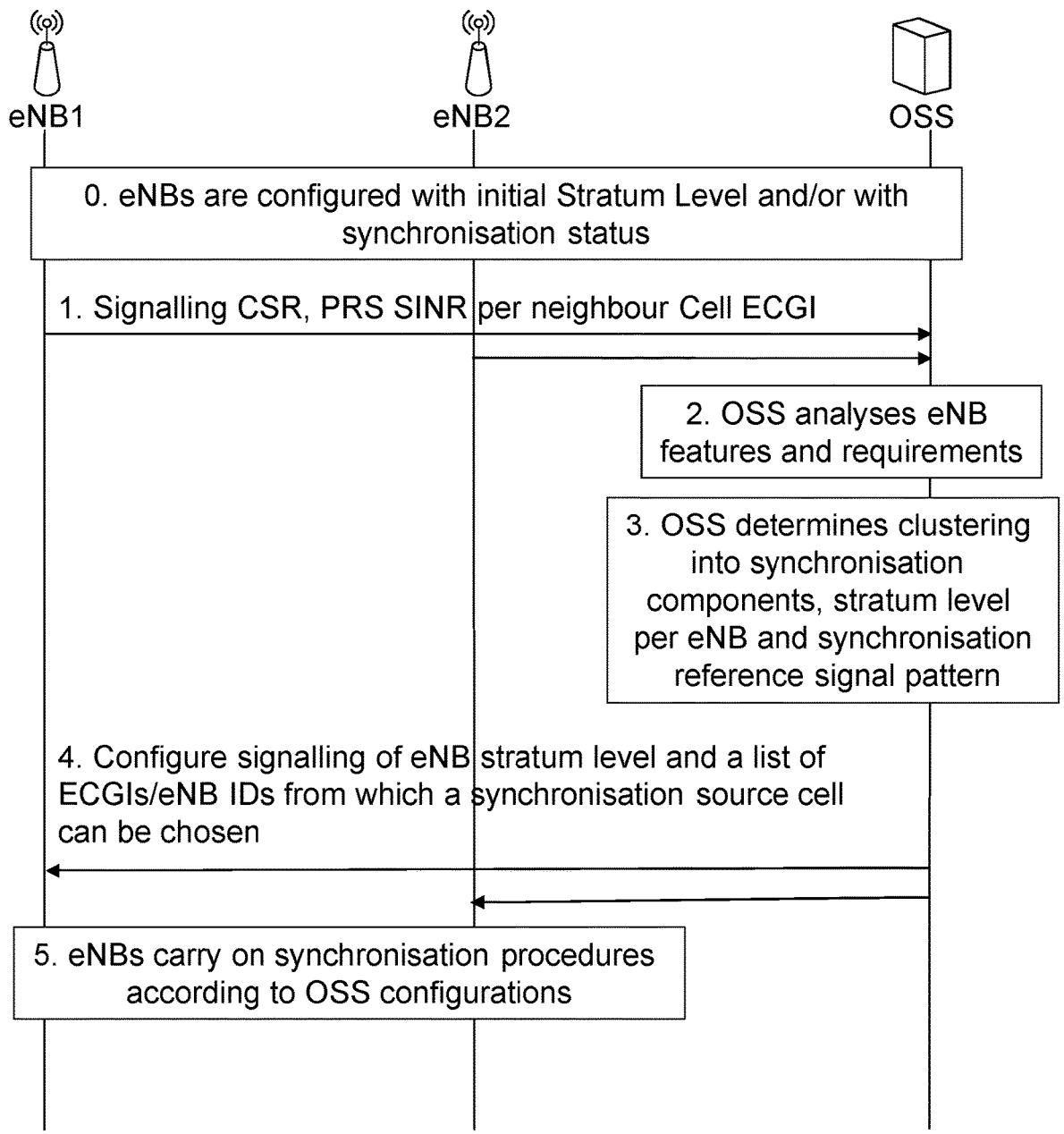
FIG. 15 is an illustration of an embodiment of a signaling scheme for radio interface based synchronisation.

One embodiment of such a solution can be described by the signaling scheme of FIG. 15. In this embodiment, the network node performing the configuration work is a node in the OSS.

eNBs are configured with initial Stratum Level and/or with synchronisation status depending on the connected synchronisation source.

Initially, each eNB becoming operational is provided with an initial stratum level and/or synchronisation status. The synchronisation status can be configured by the eNB to synchronous or asynchronous depending on the synchronisation clock reference connected to it or it can be provided by an on-off configuration. The initial stratum level may e.g. be set to "0".

In a first stage, the eNBs signal to a central node, e.g. an OSS node, SINR of CRS and/or PRS, preferably per neighbour Cell EGCI. Optionally the SINR is associated to a pattern of subframes on which the measurement has been collected. The pattern is expressed as the offset in subframes from the start of SFN0 of the reporting node and a subframe period, i.e. a number of subframes after which the measurement was taken. If no pattern is provided the measurements may be associated to an average value In a second stage, the central node receives the measurements from each eNB and determines the neighbour relation (from a radio condition point of view) between different cells, for example it determines the radio proximity of such cells. The OSS analyses the features enabled in each eNB and depending on the features enabled in each eNB, the central node determines the synchronisation requirement for each cell. If geolocation information, e.g. coordinates, for the eNB's Transmission Points (TPs) are available, the central node, i.e. in this embodiment the OSS node analyses proximity and propagation delays between TPs serving different cells. In this way an estimate of the synchronisation accuracy that each cell can derive by taking a neighbour cell RS as synchronisation source, i.e. from CRS/PRS SINR plus the estimated propagation delay accuracy, can be deduced. The central node determines the nodes that might be aggressors or victims by evaluating the synchronisation status and initial stratum level of each eNB. This reveals if the node is connected to a reliable source of synchronisation. The central node further utilizes evaluation of the RS SINR for each neighbour cell. The central node determines the best way to cluster cells in a way that an opportune number of nodes in need for synchronisation connect to the best synchronisation source node and so that muting patterns to be enabled by neighbouring aggressor nodes are minimised in terms of muted resources. In other words, the OSS preferably also analyses the need for muting patterns at aggressor eNBs, e.g. eNBs with synchronous state and stratum level "0" or eNBs with high transmission power.

In a third stage, the OSS determines the clustering of cells for synchronisation purposes. Thus, the central node converges on the clustering of cells for synchronisation purposes. Furthermore, the initial stratum level per eNB is set. Optionally, the synchronisation status per eNB is determined. Preferably, the muting pattern per eNB per cell, i.e. pattern of muted SF:s identified by SF offset and SF period, is established. A synchronisation reference signal pattern, i.e. pattern of SFs where synch RS is present, identified by SF offset and SF period, is determined. If the OSS knows geolocation of each cell TP OSS also determines the propagation delay offset between each synchronisation source and synchronisation target.

In a fourth stage, the configuration is signaled back to the eNBs. The configuration comprises the eNB stratum level.

Optionally, the configuration comprises synchronisation status. Also optionally, the configuration comprises propagation delay offset. Muting patterns per cell may also be included. A listening SF pattern per cell is signaled as well as clustering decisions. These are provided by means of providing the eNB with a list of ECGIs/eNB IDs from which a synchronisation source cell can be chosen. Furthermore, priority among the cells listed as synchronisation sources is provided, where each cell is prioritised in terms of synchronisation accuracy that can be achieved by the synchronisation target. The synchronisation allows the eNBs to act autonomous and allow fast switch over to alternative synchronisation source without putting latency restrictions on communication link between eNBs and central node. The eNB will then inform central node about change and provide new updated measurements after such event. This will be further discussed below.

In a fifth stage, the eNBs carry on synchronisation procedures according to the received OSS configurations.

One particular embodiment of the method of setting up the optimal synchronisation paths could be further described as follows. In this embodiment eNBs participating in RIBS are connected to a central node. Such central node may be for example another eNB, the operations, administration and maintenance (OAM) or a dedicated system. In this embodiment each pair of eNBs that could interact via RIBS is associated with a number of so called "weights". In other words, the creation of the radio interface based synchronisation configuration comprises assigning of all links between radio base stations of the multitude of radio base stations with weights. The weights are dependent on the hearability information and the synchronisation ability information. Thereby, the defining of synchronisation links can be based on those weights.

The set of weights could be made of different parameters influencing the use of RIBS such as SINR of the signal of each eNB towards the other eNB in the pair, timing accuracy that can be achieved via RIBS, need for muting activation by neighbour cells, availability of other synchronisation solutions, etc. In other words, the weights are dependent on at least one of a signal-to-interference-and-noise ratio, a node availability, and an availability to correct for propagation delay errors.

In a particular example of this embodiment the network of eNBs interconnected with RIBS can be represented by a graph G where the eNBs are represented by the vertex set V(G) and the links by the edge set E(G), see e.g. FIG. 10. The graph is a so called weighted graph where each edge 71 is associated with a weight. The set of weights would depend on the usage of the graph and as described above it could be for example SINR, timing accuracy.

The set of edge weights that corresponds to timing accuracy can be estimated from one or several parameters. For example:

SINR—A high SINR value would indicate a good timing signal. A high SINR may be due to several reasons like short distance, direct line of sight to the source eNB or no strong reflected versions of the signal. In case of low SINR value, muting patterns can be assigned to aggressing nodes.

Delay errors—Physical distance of the edge, i.e. the distance between two adjacent eNBs, and method for correcting for the distance may influence the weights. Any propagation delay would add an error to the recovered timing if not compensated for. There are various methods for estimating the compensation delay and some will have a residual error or introduce noise. It is not possible to compensate for the propagation delay if the distance is not known. Such a link should be assigned a high timing uncertainty.

Node availability—A link that goes down because the source eNB occasionally enters a Sleep Mode could cause periodic reconfiguration of the synchronisation trails. A source eNB with an inadequate GNSS installation, e.g. not a clear sky view, that loses time synchronisation periodically is not a good candidate either.

The first part of the procedure described herein is to identify the nodes that will participate in the RIBS coordination. In the example above, this translates into a first step to set up the sync trail for each eNB by identifying the graphs components, i.e. the synchronisation components. This will simplify and reduce the number of calculations. A component is a subset of the graph so that $G=\cup_i G_i$ and $G_i \cap G_j=0$, or differently put, a synchronisation component has no edges/links to another component and a vertex/eNB belongs to only one component, see e.g. FIG. 8

As mentioned above, in the process of identification of the nodes participating in RIBS it is important to identify nodes that would not need a common time base.

In the embodiment of the present implementation, if an edge can be defined from any vertex/eNB in the component to any other vertex in any other component where the SINR value is higher than some threshold value then the components needs to have the same time base. A common time base would be recommended also in case of UEs reporting interference from two eNBs in difference components.

It should be noticed that a timing island would not need any specific configuration or treatment and could be left running in a non-coordinated way from a time synchronisation point of view and with respect to other nodes.

In another embodiment, the method described uses the determined weights to deduce configuration requirements on the node participating in RIBS. For example, the weights could be used to determine whether any time synchronisation enhancement is needed. For example, if the time accuracy achieved with RIBS with no muting is not sufficient, then muting activation on the interfering nodes would be needed. The central node would therefore configure such interfering nodes with muting patterns and it would activate such patterns, in which case the configured muting patterns would be activated. If the synchronisation accuracy once the muting patterns are activated is not enough, then the central node may flag that enhancements such as the installation of a GNSS receiver are needed.

In the example of the method implementation based on the nodes graph, the weight set of the weighted graph that describes the timing accuracy of each edge is used. Each component is divided into one or several tree subgraphs, i.e. a forest, where each tree has at least one vertex with a timing reference. The division into tree subgraphs is done in such a way that the sum of the weights of the path from any vertex to a vertex with a sync source is minimized. In other words, the defining of synchronisation links selects optimum links according to an optimum link criterion based on the weights. This is e.g. depicted in FIG. 11.

In certain embodiments or implementations, the different aspects of the weights may be difficult to tune to achieve an objective minimization of the weights. In such cases, it might be sufficient to select paths from a certain vertex to vertex with a sync source that is acceptable, i.e. is below a certain threshold. In other words, the defining of synchronisation links selects sufficient links according to a threshold criterion based on the weights.

In one embodiment, the radio interface based synchronisation configuration may further comprise information of alternative synchronisation links, if any, with priority. In such a way, different alternative configurations are presented. This opens up for the eNB to prepare an alternative synchronisation path as a back-up if the recommended path fails for some reason. Such alternative configurations may also give the eNB the freedom to select a "non-optimum" synchronisation path, however, with sufficient synchronisation. This may be the situation e.g. if the central node making the configuration suggestion does not take all types of parameters into consideration. In other words, the eNB may perform a local optimization based on further information available in the radio base station. Therefore, the radio interface based synchronisation configuration may further comprises information of alternative synchronisation links, if any, with priority.

Figure 21:
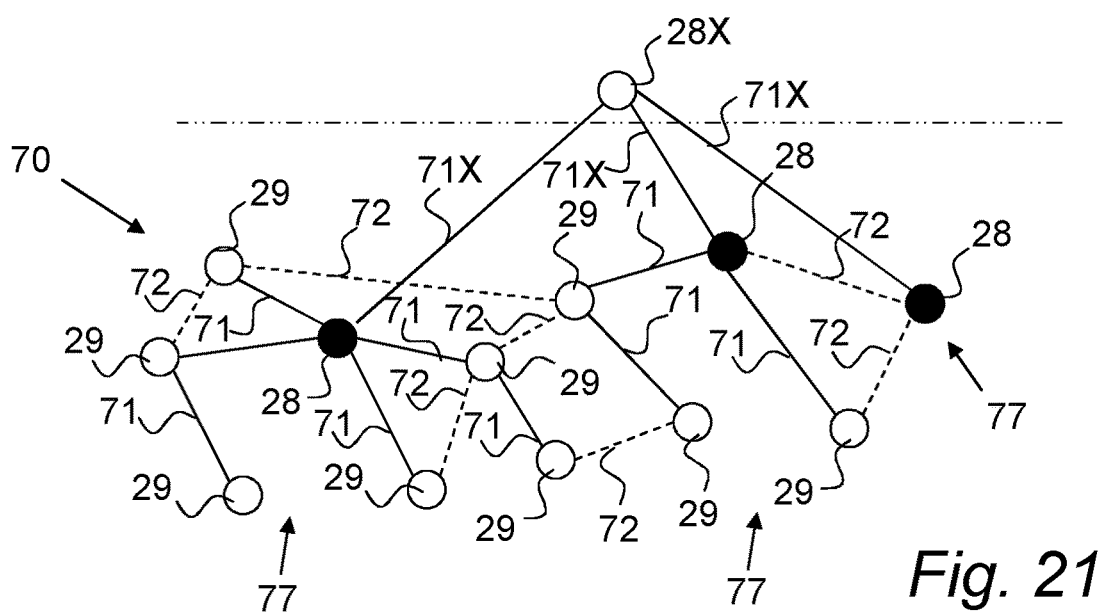
FIG. 21 is an illustration of an embodiment of a synchronisation component structured as one tree.

One way to make the division of the component into a forest in the node graph based implementation is, as schematically illustrated in FIG. 21, to introduce a new vertex 28X that has access to the perfect UTC/GPS time. This vertex 28X will be the root vertex in a spanning tree with new edges 71X towards the earlier root vertices. The new vertex 28X thus corresponds to a fictive node and the new edges 71X correspond to fictive links. The synchronisation component is thereby structured as one single tree. An eNB with a timing reference is a vertex with and edge to the root vertex and the weight of the edge is the estimated timing accuracy in that eNB. The configuration of the RIBS links corresponds now to a "shortest path" problem for which several algorithms exists as for example Dijkstra's algorithm. Observe that if the perfect timing root vertex is removed, the tree will be a forest where each eNB with a timing reference is the root vertex in a tree.

In other words, the defining of synchronisation links in turn comprises defining of a fictive node, assumed to have a perfect time reference, and defining of fictive links between synchronisation reference nodes and the fictive node. The fictive links are given weights corresponding to an estimated timing accuracy of respective synchronisation reference nodes. The defining of synchronisation links further comprises finding a set of links between respective base station and the fictive node, having an optimum sum of weights of the links of the set of links. This is performed for each radio base station. The set of links achieved in this way form the configuration of synchronisation links. Finally, the fictive node and fictive links are removed from the configuration of synchronisation links.

A link could also be an IEEE1588v2 PTP connection where an eNB with a timing reference is acting as a Grand Master (GM). The timing accuracy could be based on number of hops, round-trip delay, packet delay variation (PDV) and/or a configured value.

As mentioned above, a link could also be based on UE measurement, e.g. Hand Over messages. The timing accuracy could be based on the number of UEs interacting, the distance between the eNBs, the variance of the measurements and/or a configured value.

In another embodiment of this method, the central node also determines the propagation delays between two coupled nodes cooperating in the same RIBS process. Such propagation delay can be determined by knowing the geolocation, namely the geographical coordinates, of each node's transmission point (TP) as well as the cells served by such transmission point. The central coordinator can configure in each RIBS coupled node a propagation delay offset calculated as the propagation delay accrued for line of site transmission and reception between two transmission/reception points each connected to one of the coupled eNBs. An eNBs that synchronises to a neighbour eNB can use this configured propagation delay value (i.e. propagation delay with the transmission point of relevance in the neighbour synchronisation source eNB) to adjust its clock in order to improve synchronisation with the synchronisation source.

In another embodiment, the central node can use the propagation delay between eNBs TPs as a parameter to judge which synchronisation source eNB is better for a given synchronisation target eNB. Due to the fact that large line of sight propagation delays might be subject to large variations caused by multipath, it might be more reliable to use a synchronisation source eNB with a small propagation delay towards the synchronisation target.

In another embodiment, the central node analyse statistics based on UE data over time, to continuously evaluate UE experienced synchronisation quality in the network and based on analysed data, improvements could be proposed. The UE could report information about neighbour received power, interference situation, synchronisation quality etc. For services where timing at the UE reception point matters like Dual Connectivity, due to difference in propagation delays, UE data can give a better picture of what level of coordination can be achieved from eNBs through timing offset estimates.

The procedure in the radio base station of monitoring experienced signal quality of signals and providing data defining the experienced signal quality of signals may be performed upon request. The procedure in the central node of obtaining hearability information and synchronisation ability information concerning the multitude of radio base stations may be performed as a response to a change of system configuration influencing the multitude of radio base stations. This can be initiated e.g. by a system operator.

Alternatively or complementary, by periodically collecting information based on both direct eNB measurements and indirect ones from connected UE's, the central node automatically monitors changes in the network over time. These changes may e.g. caused by change of eNB capability, new services, new network nodes, temporary or permanent removal of nodes or changes in radio environment. The monitoring, in the radio base station, of experienced signal quality of signals and providing data defining the experienced signal quality of signals may be performed regularly or intermittently according to a predetermined schedule. Based on such information the central node acts and dynamically tune the network for optimal synchronisation performance in a pro-active way. The procedure of obtaining hearability information and synchronisation ability information concerning the multitude of radio base stations is thus performed regularly or intermittently according to a predetermined schedule.

In addition to periodic based reporting to the central node, participating eNBs could, based on central node pre-defined trigger conditions, initiate reporting. In other words, the process of radio interface based synchronisation in the radio base station may comprise the further step of issuing a request for updating the radio interface based synchronisation configuration. An example of such trigger condition could be if an eNB suddenly experience unexpected change in SINR above a specified threshold toward its neighbours or even detects presence of new neighbours. This may even force the eNB to perform a fast change of synchronisation source as mentioned previously. Triggers could also be set based on reports from UEs connected to the eNB. In the central node, the obtaining of hearability information and synchronisation ability information concerning the multitude of radio base stations is thereby performed triggered by a request from a radio base station of the multitude of radio base stations.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 16:
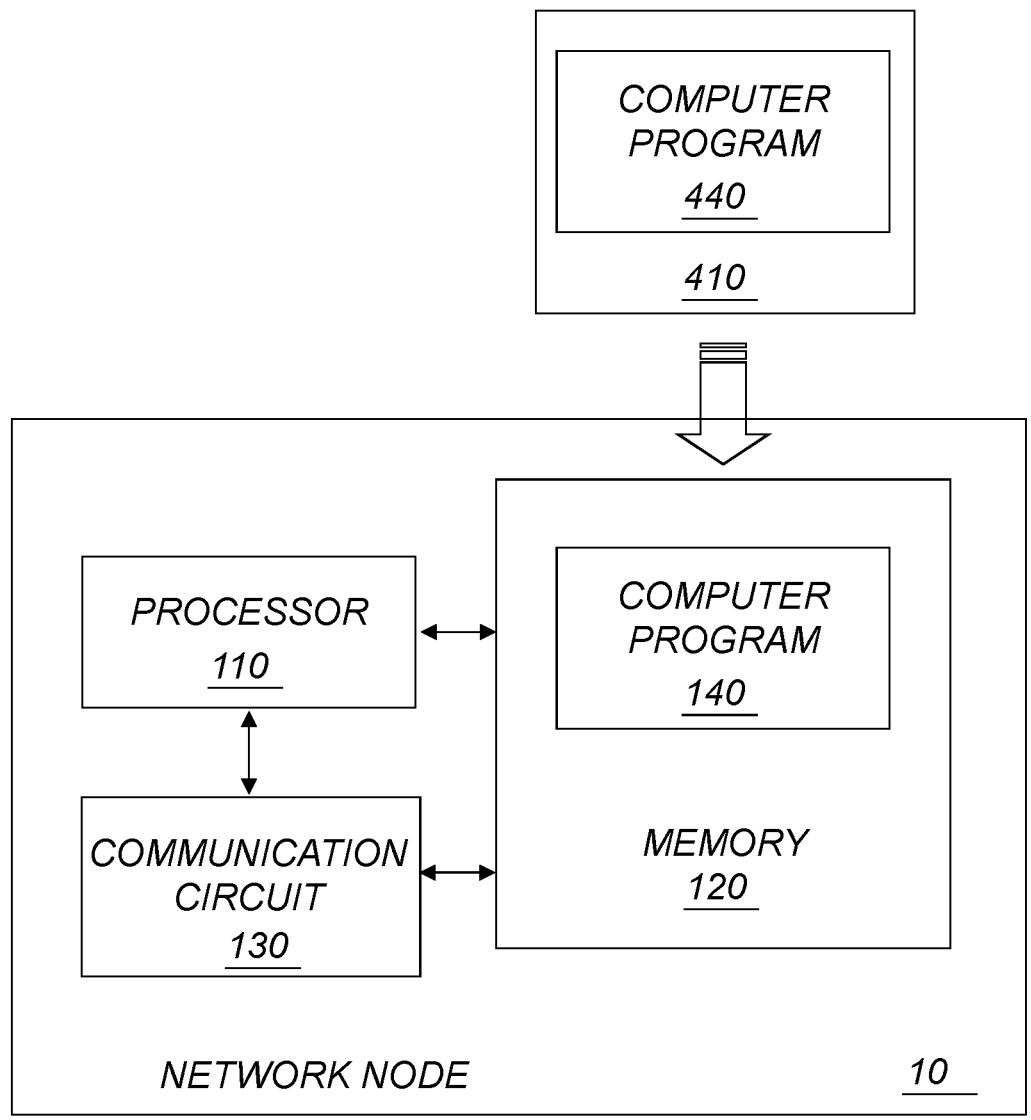
FIG. 16 is a block diagram of parts of an embodiment of a network node.

FIG. 16 is a schematic block diagram illustrating an example of a network node 10, based on a processor-memory implementation according to an embodiment. In this particular example, the network node 10 is configured to configure radio interface based synchronisation and comprises a processor 110 and a memory 120. The memory 120 comprises instructions executable by the processor 110. Thereby the network node 10 is configured to obtain hearability information and synchronisation ability information concerning a multitude of radio base stations. The hearability information comprises, for each radio base station of said multitude of radio base stations, an identity of the radio base station under consideration, and experienced signal quality of signals from other radio base stations of the multitude of radio base stations and identities of the other radio base stations of the multitude of radio base stations. The synchronisation ability information comprises, for each radio base station of the multitude of radio base stations, information about a quality of synchronisation, other than radio interface based synchronisation, obtainable by the radio base station under consideration. The network node 10 is configured to create a radio interface based synchronisation configuration for the multitude of radio base stations, in dependence of the obtained hearability information and synchronisation ability information. The radio interface based synchronisation configuration comprises definition of synchronisation links, which radio base stations of the multitude of radio base stations are recommended to use for synchronisation purposes. The network node 10 is furthermore configured to provide data defining the radio interface based synchronisation configuration for transmission to the respective radio base stations.

The network node 10 also includes a communication circuit 130. The communication circuit 130 includes functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s). In other words, the network node 10 comprises communication circuitry 130 configured to obtain hearability information and synchronisation ability information concerning a multitude of radio base stations and to provide data defining the radio interface based synchronisation configuration for transmission to the respective radio base stations.

A network node may in other embodiments be based on a hardware circuitry implementation. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

A network node may in further other embodiments be based on combination of both processors and hardware circuitry in connection with suitable memory units. The network node then comprises one or more processors, memory including storage for software and data, and one or more units of hardware circuitry such as ASICs and/or FPGAs. The overall functionality is thus partitioned between programmed software (SW) for execution on one or more processors and one or more pre-configured or possibly reconfigurable hardware circuits such as ASICs and/or FPGAs. The actual hardware-software partitioning can be decided by a system designer based on a number of factors including processing speed, cost of implementation and other requirements.

FIG. 16 is a schematic diagram illustrating an example of a computer-implementation according to an embodiment of a network node 10. The network node 10 comprises a processor 110 and a memory 120. The memory 120 comprises instructions executable by the processor 110. In this particular example, at least some of the steps, functions, procedures, modules and/or blocks described herein are implemented in a computer program 140, which is loaded into the memory 120 for execution by processing circuitry including one or more processors 110. The computer program 140 can be provided as a computer program 440 loaded on a carrier 410. The processor 110 and memory 120 are interconnected to each other to enable normal software execution. The processor is thus operative to create a radio interface based synchronisation configuration for the multitude of radio base stations, in dependence of the obtained hearability information and synchronisation ability information.

Figure 17:
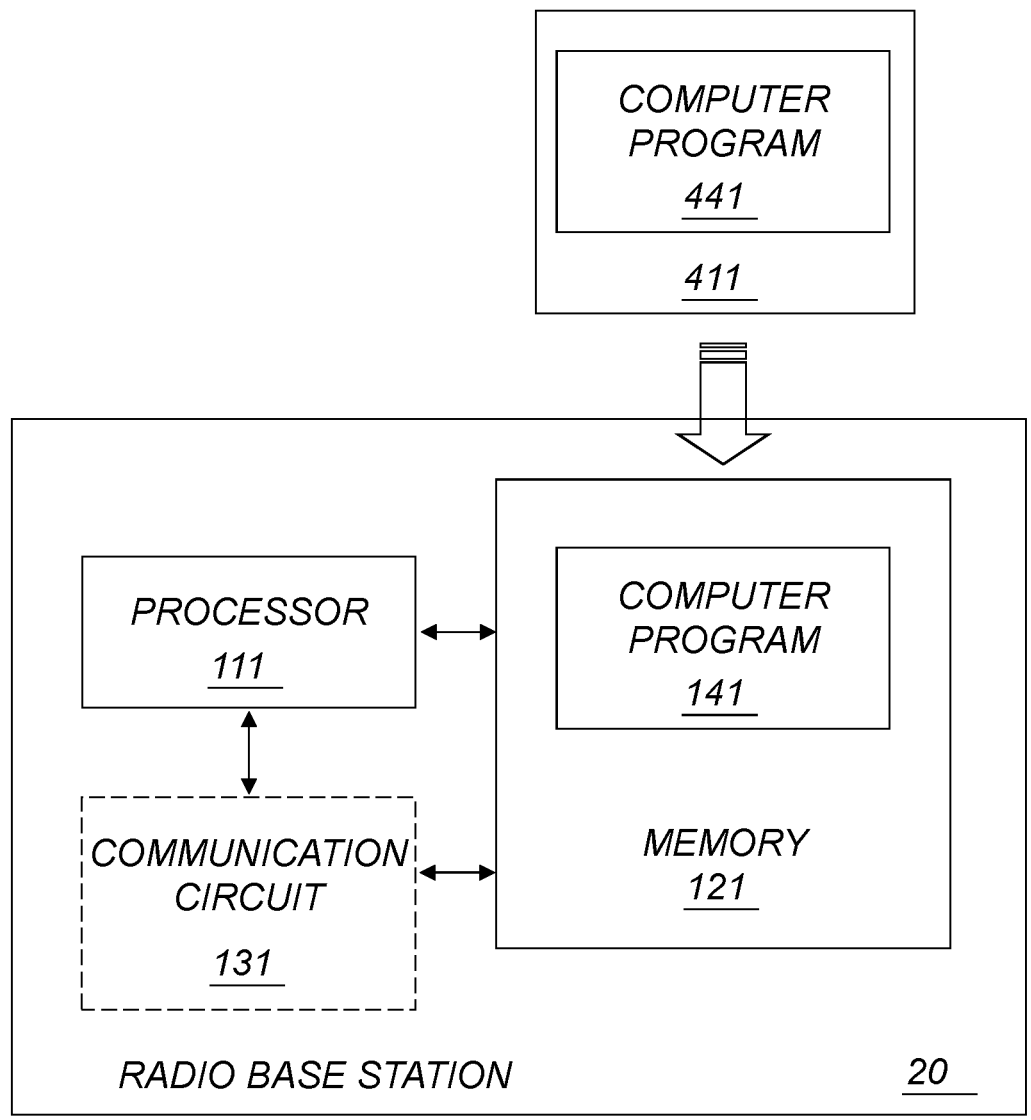
FIG. 17 is a block diagram of parts of an embodiment of a radio base station.

FIG. 17 is a schematic block diagram illustrating an example of a radio base station 20, based on a processor-memory implementation according to an embodiment. In this particular example, the radio base station 20 is configured to perform radio interface based synchronisation and comprises a processor 111 and a memory 121. The memory 121 comprises instructions executable by the processor 111. Thereby the radio base station 20 is configured to monitor experienced signal quality of signals from other base stations. The base station 20 is configured to provide data defining the experienced signal quality of signals and identities of each of the other base stations for transmission to a network node, as well as an identity of the base station. The base station 20 is configured to obtain data defining a radio interface based synchronisation configuration from the network node. The base station 20 is configured to set up radio interface based synchronisation links according to the obtained data defining a radio interface based synchronisation configuration.

The radio base station 20 also includes a communication circuit 131. The communication circuit 131 includes functions for wired and/or wireless communication with other devices and/or network nodes in the network. In a particular example, the communication circuit 131 may be based on radio circuitry for communication with one or more other nodes, including transmitting and/or receiving information. The communication circuit 131 may be interconnected to the processor 111 and/or memory 121. By way of example, the communication circuit 131 may include any of the following: a receiver, a transmitter, a transceiver, input/output (I/O) circuitry, input port(s) and/or output port(s). In other words, the radio base station 20 comprises communication circuitry 131 configured to provide data defining the experienced signal quality of signals and identities of each of the other base stations for transmission to a network node, as well as an identity of the base station and to obtain data defining a radio interface based synchronisation configuration from the network node.

A radio base station may in other embodiments be based on a hardware circuitry implementation. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

A radio base station may in further other embodiments be based on combination of both processors and hardware circuitry in connection with suitable memory units. The network node then comprises one or more processors, memory including storage for software and data, and one or more units of hardware circuitry such as ASICs and/or FPGAs. The overall functionality is thus partitioned between programmed software (SW) for execution on one or more processors and one or more pre-configured or possibly reconfigurable hardware circuits such as ASICs and/or FPGAs. The actual hardware-software partitioning can be decided by a system designer based on a number of factors including processing speed, cost of implementation and other requirements.

FIG. 17 is a schematic diagram illustrating an example of a computer-implementation according to an embodiment of a radio base station 20. The radio base station 20 comprises a processor 111 and a memory 121. The memory 121 comprises instructions executable by the processor 111. In this particular example, at least some of the steps, functions, procedures, modules and/or blocks described herein are implemented in a computer program 141, which is loaded into the memory 121 for execution by processing circuitry including one or more processors 111. The computer program 141 can be provided as a computer program 441 loaded on a carrier 411. The processor 111 and memory 121 are interconnected to each other to enable normal software execution. The processor is thus operative to monitor experienced signal quality of signals from other base stations and to set up radio interface based synchronisation links according to said obtained data defining a radio interface based synchronisation configuration.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the at least one processor to obtain hearability information and synchronisation ability information concerning a multitude of radio base stations. The hearability information comprises, for each radio base station of the multitude of radio base stations, an identity of the radio base station under consideration, and experienced signal quality of signals from other radio base stations of the multitude of radio base stations and identities of the other radio base stations of the multitude of radio base stations. The synchronisation ability information comprises, for each radio base station of the multitude of radio base stations, information about a quality of synchronisation, other than radio interface based synchronisation, obtainable by the radio base station under consideration. The instructions, when executed by at least one processor, cause the at least one processor to further create a radio interface based synchronisation configuration for the multitude of radio base stations, in dependence of the obtained hearability information and synchronisation ability information. The radio interface based synchronisation configuration comprises definition of synchronisation links, which radio base stations of the multitude of radio base stations are recommended to use for synchronisation purposes. The instructions, when executed by at least one processor, cause the at least one processor to further provide data defining the radio interface based synchronisation configuration for transmission to the respective radio base stations.

In a particular embodiment, the computer program comprising instructions, which when executed by at least one processor in a base station, cause the at least one processor to monitor experienced signal quality of signals from other base stations. The instructions, when executed by at least one processor, cause the at least one processor to further provide data defining the experienced signal quality of signals and identities of each of the other base stations for transmission to a network node, as well as an identity of the base station. The instructions, when executed by at least one processor, cause the at least one processor to obtain data defining a radio interface based synchronisation configuration from the network node. The instructions, when executed by at least one processor, cause the at least one processor to further set up radio interface based synchronisation links according to the obtained data defining a radio interface based synchronisation configuration.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

In other words, a computer-program product comprises a computer-readable medium having stored thereon a computer program according to the embodiments presented above.

Also in other words, a carrier comprises the computer program according to the embodiments presented above, wherein the carrier is one of an electronic signal, an optical signal, an electromagnetic signal, a magnetic signal, an electric signal, a radio signal, a microwave signal, or a computer-readable storage medium.

By way of example, related to FIGS. 16 and 17, the software or computer program 440; 441 may be realized as a computer program product, which is normally carried or stored on a computer-readable medium 410; 411, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18:
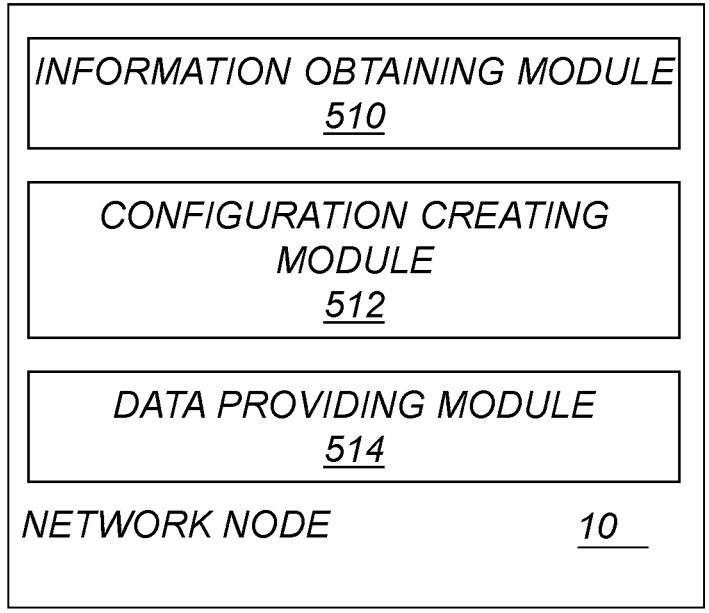
FIG. 18 is a block diagram of parts of a module embodiment of a network node.

FIG. 18 is a schematic diagram illustrating an example of a network node 10 for configuration of radio interface based synchronisation. The network node 10 comprises an information obtaining module 510 for obtaining hearability information and synchronisation ability information concerning a multitude of radio base stations. The hearability information comprises, for each radio base station of the multitude of radio base stations, an identity of the radio base station under consideration, and experienced signal quality of signals from other radio base stations of the multitude of radio base stations and identities of the other radio base stations of the multitude of radio base stations. The synchronisation ability information comprising, for each radio base station of the multitude of radio base stations, information about a quality of synchronisation, other than radio interface based synchronisation, obtainable by the radio base station under consideration. The network node 10 further comprises a configuration creating module 512 for creating a radio interface based synchronisation configuration for the multitude of radio base stations, in dependence of the obtained hearability information and synchronisation ability information. The radio interface based synchronisation configuration comprising definition of synchronisation links, which radio base stations of the multitude of radio base stations are recommended to use for synchronisation purposes. The network node 10 further comprises a data providing module 514 for providing data defining the radio interface based synchronisation configuration for transmission to the respective radio base stations.

Figure 19:
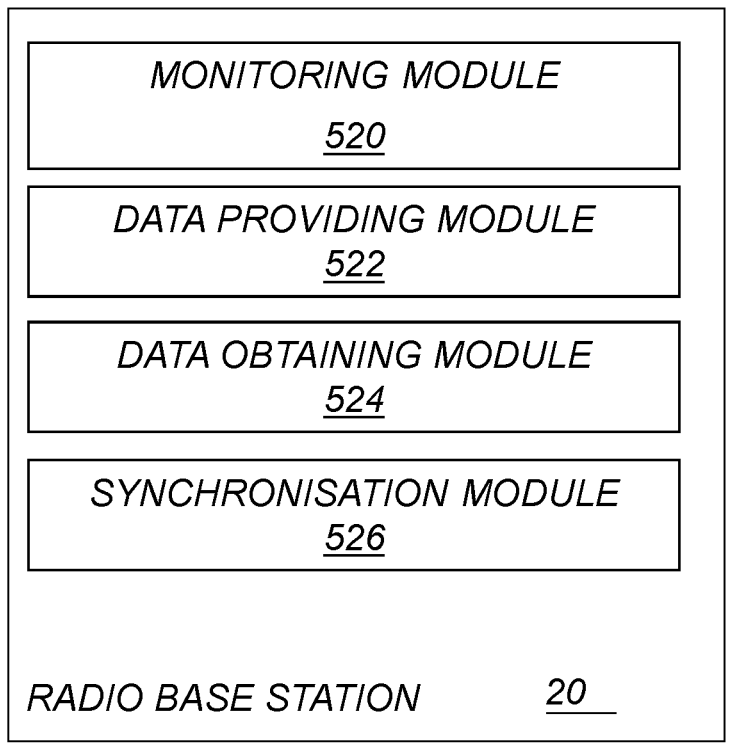
FIG. 19 is a block diagram of parts of a module embodiment of a radio base station.

FIG. 19 is a schematic diagram illustrating an example of a radio base station 20. The radio base station 20 comprises a monitoring module 520 for monitoring experienced signal quality of signals from other base stations. The radio base station 20 further comprises a data providing module 522 for providing data defining the experienced signal quality of signals and identities of each of the other base stations for transmission to a network node, as well as an identity of the base station. The radio base station 20 further comprises a data obtaining module 524 for obtaining data defining a radio interface based synchronisation configuration from the network node.

The radio base station 20 further comprises a synchronising module 526 for setting up radio interface based synchronisation links according to the obtained data defining a radio interface based synchronisation configuration.

Alternatively it is possible to realize the module(s) in FIGS. 18 and 19 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The network node device may be any suitable network device in the wireless communication system, or a network device in connection with the wireless communication system. By way of example, the network node device may be a suitable network node such a radio base station or an access point. However, the network device may alternatively be a cloud-implemented network device.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 20:
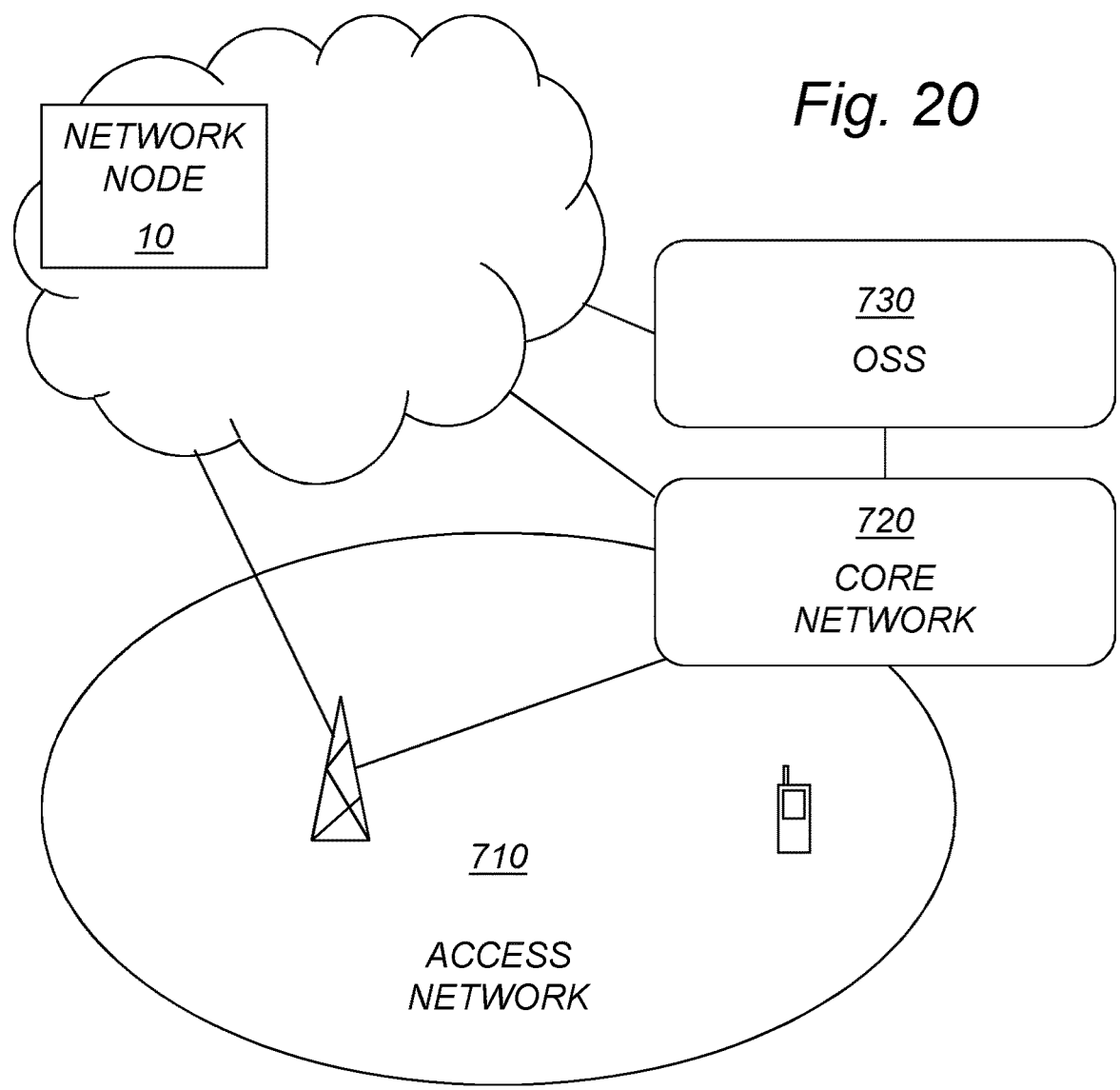
FIG. 20 is a schematic diagram illustrating an embodiment of a wireless communication system utilizing cloud-based network nodes.

FIG. 20 is a schematic diagram illustrating an example of a wireless communication system, including an access network 710 and/or a core network 720 and/or an Operations and Support System (OSS), 730 in cooperation with one or more cloud-based network nodes 10. Functionality relevant for the access network 710 and/or the core network 720 and/or the OSS system 730 may be at least partially implemented for execution in a cloud-based network node 10, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

3GPP 3rd Generation Partnership Project
ASIC Application Specific Integrated Circuits
BTS Base Transceiver Stations
CD Compact Disc
CN Core Network
COTS Common Off-The-Shelf
CPE Customer Premises Equipment
CPU Central Processing Units
CRS Cell-specific Reference Signal
DM Domain Manager
DSP Digital Signal Processors
DVD Digital Versatile Disc
ECGI E-UTRAN Cell Global Identifier
eICIC enhanced Inter-Cell Interference Coordination
eMBMS evolved Multimedia Broadcast and Multicast Services
eNB evolved Node B
E-UTRAN Evolved UMTS Terrestrial Radio Access Network
FPGA Field Programmable Gate Arrays
GM Grand Master
GNSS Global Navigation Satellite System
GPS Global Positioning System
GSM Global System for Mobile communication
GW GateWay
HDD Hard Disk Drive
HeNB Home eNB
HW hardware
ID Identity
IE Information Element
I/O input/output
LEE Laptop Embedded Equipment
LME Laptop Mounted Equipment LTE Long Term Evolution
MEM memory units
MME Mobility Management Entity
ND Network Device
NE Node Element
NFV Network Function Virtualization
NI Network Interfaces
NIC Network Interface Controller
NM Network Manager
NN Network Node
OAM Operations, Administration and Maintenance
OFDM Orthogonal Frequency Division Multiplexing
OS Operating System
OSS Operations and Support System
OTDOA Observed Time Difference Of Arrival
PC Personal Computer
PDA Personal Digital Assistant
PDV Packet Delay Variation
PLC Programmable Logic Controllers
PRS positioning reference signal
PTP Precision Time Protocol
RAN Radio Access Network
RAM Random Access Memory
RB Resource Block
RE Resource Element
REG registers
RIBS Radio Interface Based Synchronisation
ROM Read-Only Memory
RRU Remote Radio Units
RS Resource Symbol
SF Sub Frame
SFN System Frame Number
S-GW Service GateWays
SINR signal-to-interference-plus-noise ratio
STA Station
SON Self-Organizing Network
SW software
TP Transmission Point
UE User Equipment
UMB Ultra Mobil Broadband
UMTS Universal Mobile Telecommunications System
USB Universal Serial Bus
UTC Coordinated Universal Time
UTRAN UMTS Terrestrial Radio Access Network
VM Virtual Machine
VMM Virtual Machine Monitor
VNE Virtual Network Element
WCDMA Wideband Code Division Multiple Access
WNIC Wireless Network Interface Controller

The invention claimed is:

1. A method for configuration of radio interface based synchronisation, wherein said method comprises the steps of:
obtaining hearability information and synchronisation ability information concerning a multitude of radio base stations;
said hearability information comprises, for each radio base station of said multitude of radio base stations,
an identity of the radio base station under consideration, and
experienced signal quality of signals from other radio base stations of said multitude of radio base stations and identities of said other radio base stations of said multitude of radio base stations;
said synchronisation ability information comprising, for each radio base station of said multitude of radio base stations, information about a quality of synchronisation, other than radio interface based synchronisation, obtainable by the radio base station under consideration;
creating a radio interface based synchronisation configuration for said multitude of radio base stations, in dependence of said obtained hearability information and synchronisation ability information;
said radio interface based synchronisation configuration comprising definition of synchronisation links, which radio base stations of said multitude of radio base stations are recommended to use for synchronisation purposes; and
providing data defining said radio interface based synchronisation configuration for transmission to the respective radio base stations.

2. The method according to claim 1, wherein said step of creating a radio interface based synchronisation configuration comprises:
dividing said multitude of radio base stations into at least one synchronisation component;
each radio base station in a synchronisation component being without hearability relative to all radio base stations outside the same synchronisation component;
if a particular synchronisation component comprises more than one radio base station, each radio base station in said particular synchronisation component has hearability relative to at least one other radio base station in said particular synchronisation component;
wherein said radio interface based synchronisation configuration is created individually for each synchronisation component.

3. The method according to claim 2, wherein said step of creating a radio interface based synchronisation configuration further comprises, if no radio base station in a particular synchronisation component has said quality of synchronisation above a first threshold, assigning one radio base station in said particular synchronisation component as said synchronisation reference node.

4. The method according to claim 1, wherein said step of creating a radio interface based synchronisation configuration comprises:
assigning each radio base station having said quality of synchronisation above said first threshold as a synchronisation reference node;
defining said synchronisation links in a tree structure between each radio base station having said quality of synchronisation below a first threshold and a said synchronisation reference node, either directly or via another radio base station.

5. The method according to claim 1, wherein said step of obtaining hearability information and synchronisation ability information comprises the step of receiving hearability information and synchronisation ability information from nodes in a wireless communication system comprising said multitude of radio base stations.

6. The method according to claim 1, wherein said step of providing data defining said radio interface based synchronisation configuration comprises transmission of said data defining said radio interface based synchronisation configuration to the respective radio base stations.

7. The method according to claim 1, wherein said experienced signal quality of signals from other radio base stations of said multitude of radio base stations comprises signal-to-interference-and-noise ratio in reference signals.

8. The method according to claim 7, wherein said signal-to-interference-and-noise ratio is associated to a pattern of subframes on which the measurement has been collected.

9. The method according to claim 1, wherein said step of obtaining hearability information and synchronisation ability information further comprises obtaining of information enabling estimation of propagation delay compensation regarding at least two radio base stations of said multitude of radio base stations, wherein said step of creating said radio interface based synchronisation configuration comprises the step of determining propagation delay errors between radio base stations being associated with said information enabling estimation of propagation delay compensation, wherein said radio interface based synchronisation configuration is created in further dependence of said propagation delay errors.

10. The method according to claim 9, wherein said information enabling estimation of propagation delay compensation comprises position information regarding at least two radio base stations of said multitude of radio base stations.

11. The method according to claim 1, wherein said step of obtaining hearability information and synchronisation ability information further comprises obtaining information from user equipments being within hearability of two radio base stations of said multitude of radio base stations, said information from user equipments comprising experienced interference between signals from said two radio base stations, wherein said radio interface based synchronisation configuration is created in further dependence of said information from user equipments.

12. The method according to claim 1, wherein said step of creating said radio interface based synchronisation configuration comprises the step of assigning all links between radio base stations of said multitude of radio base stations with weights;
  said weights being dependent on said hearability information and said synchronisation ability information;
  wherein said defining of synchronisation links is based on said weights.

13. The method according to claim 12, wherein said weights being dependent on at least one of:
  signal-to-interference-and-noise ratio,
  node availability, and
  availability to correct for propagation delay errors.

14. The method according to claim 12, wherein said defining of synchronisation links selects optimum links according to an optimum link criterion based on said weights.

15. The method according to claim 12, wherein said defining of synchronisation links in turn comprises the steps of:
  defining a fictive node, assumed to have a perfect time reference;
  defining fictive links between synchronisation reference nodes and said fictive node, said fictive links being given weights corresponding to an estimated timing accuracy of respective synchronisation reference nodes;
  finding, for each base station, a set of links between respective base station and said fictive node, having an optimum sum of weights of the links of said set of links, said set of links forming said configuration of synchronisation links; and
  removing said fictive node and fictive links from said configuration of synchronisation links.

16. The method according to claim 12, wherein said defining of synchronisation links selects sufficient links according to a threshold criterion based on said weights.

17. The method according to claim 1, wherein said radio interface based synchronisation configuration further comprises information of alternative synchronisation links, if any, with priority.

18. The method according to claim 1, wherein said radio interface based synchronisation configuration further comprises information of a muting pattern.

19. The method according to claim 1, wherein said step of obtaining hearability information and synchronisation ability information concerning said multitude of radio base stations is performed as a response to a change of system configuration influencing said multitude of radio base stations.

20. The method according to claim 1, wherein said step of obtaining hearability information and synchronisation ability information concerning said multitude of radio base stations is performed regularly or intermittently according to a predetermined schedule.

21. The method according to claim 1, wherein said step of obtaining hearability information and synchronisation ability information concerning said multitude of radio base stations is performed triggered by a request from a radio base station of said multitude of radio base stations.

22. A method for radio interface based synchronisation, wherein said method comprises the steps of:
  monitoring, in a base station, experienced signal quality of signals from other base stations;
  providing data defining said experienced signal quality of signals and identities of each of said other base stations for transmission to a network node, as well as an identity of said base station;
  obtaining data defining a radio interface based synchronisation configuration from said network node; and
  setting up radio interface based synchronisation links according to said obtained data defining a radio interface based synchronisation configuration.

23. The method according to claim 22, comprising the further step of providing data defining synchronisation ability information of said base station for transmission to said network node.

24. The method according to claim 22, wherein said experienced signal quality of signals from other radio base stations comprises signal-to-interference-and-noise ratio in reference signals.

25. The method according to claim 24, wherein said signal-to-interference-and-noise ratio is associated to a pattern of subframes on which the measurement has been collected.

26. The method according to claim 22, wherein further step of providing data defining information enabling estimation of propagation delay compensation regarding communication between said base station and other radio base stations for transmission to said network node.

27. The method according to claim 26, wherein said information enabling estimation of propagation delay compensation comprises position information.

28. The method according to claim 22, comprising further steps of:
  receiving information from user equipments being within hearability of two radio base stations;
  said information from user equipments comprising experienced interference between signals from said two radio base stations and optionally a user equipment estimate of a time offset between said two radio base stations; and
  providing data defining said information from user equipments for transmission to said network node.

29. The method according to claim 22, wherein said radio interface based synchronisation configuration further comprises information of alternative synchronisation links, if any, with priority.

30. The method according to claim 22, wherein said radio interface based synchronisation configuration further comprises information of a muting pattern.

31. The method according to claim 22, wherein said steps of monitoring experienced signal quality of signals and providing data defining said experienced signal quality of signals are performed upon request.

32. The method according to claim 22, wherein said steps of monitoring experienced signal quality of signals and providing data defining said experienced signal quality of signals are performed regularly or intermittently according to a predetermined schedule.

33. The method according to claim 22, wherein further step of issuing a request for updating said radio interface based synchronisation configuration.

34. A network node for configuration of radio interface based synchronisation, wherein said network node comprises:
- an information obtaining module for obtaining hearability information and synchronisation ability information concerning a multitude of radio base stations;
- said hearability information comprises, for each radio base station of said multitude of radio base stations,
  - an identity of the radio base station under consideration, and
  - experienced signal quality of signals from other radio base stations of said multitude of radio base stations and identities of said other radio base stations of said multitude of radio base stations;
- said synchronisation ability information comprising, for each radio base station of said multitude of radio base stations, information about a quality of synchronisation, other than radio interface based synchronisation, obtainable by the radio base station under consideration;
- a configuration creating module for creating a radio interface based synchronisation configuration for said multitude of radio base stations, in dependence of said obtained hearability information and synchronisation ability information;
- said radio interface based synchronisation configuration comprising definition of synchronisation links, which radio base stations of said multitude of radio base stations are recommended to use for synchronisation purposes; and
- a data providing module for providing data defining said radio interface based synchronisation configuration for transmission to the respective radio base stations.

35. A base station, wherein said base station comprises:
- a monitoring module for monitoring experienced signal quality of signals from other base stations;
- a data providing module for providing data defining said experienced signal quality of signals and identities of each of said other base stations for transmission to a network node, as well as an identity of said base station;
- a data obtaining module for obtaining data defining a radio interface based synchronisation configuration from said network node; and
- a synchronising module for setting up radio interface based synchronisation links according to said obtained data defining a radio interface based synchronisation configuration.

* * * * *